US010212248B2

(12) United States Patent
Ayyagari et al.

(10) Patent No.: US 10,212,248 B2
(45) Date of Patent: Feb. 19, 2019

(54) CACHE MANAGEMENT ON HIGH AVAILABILITY ROUTERS IN A CONTENT CENTRIC NETWORK

(71) Applicant: CISCO TECHNOLOGY, INC., San Jose, CA (US)

(72) Inventors: Ramesh C. Ayyagari, Cupertino, CA (US); Priti Goel, Sunnyvale, CA (US); Mark D. Konezny, Sebastapool, CA (US)

(73) Assignee: Cisco Technology, Inc., San Jose, CA (US)

( * ) Notice: Subject to any disclaimer, the term of this patent is extended or adjusted under 35 U.S.C. 154(b) by 306 days.

(21) Appl. No.: 15/284,327

(22) Filed: Oct. 3, 2016

(65) Prior Publication Data
US 2018/0097908 A1  Apr. 5, 2018

(51) Int. Cl.
G06F 15/173 (2006.01)
H04L 29/08 (2006.01)
(Continued)

(52) U.S. Cl.
CPC ........ H04L 67/2852 (2013.01); H04L 45/021 (2013.01); H04L 65/4076 (2013.01); H04L 67/1097 (2013.01)

(58) Field of Classification Search
CPC ............. H04L 67/2852; H04L 67/1097; H04L 45/021; H04L 65/4076
(Continued)

(56) References Cited

U.S. PATENT DOCUMENTS 817,441 A   4/1906 Niesz
4,309,569 A   1/1982 Merkle
(Continued)

FOREIGN PATENT DOCUMENTS

DE  19620817 A1  11/1997
EP  0295727 A2  12/1988
(Continued)

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.
(Continued)

Primary Examiner — Wing F Chan
Assistant Examiner — Joseph R Maniwang

(57) ABSTRACT

One embodiment provides a forwarding device, comprising a plurality of components, including one or more line cards and a supervisor card. An ingress line card receives a content object with a name. In response to determining a distributed storage technique, a selected line card stores the content object in a location which is a cache of the selected line card. The selected line card creates a first entry in a table of the selected line card, wherein the first entry indicates the content object name and the location in which the content object is stored. The selected line card transmits a first notification message to other components, wherein the first notification message indicates the content object name and the location indicated in the first entry. A respective other component creates a second entry in a table for the respective other component, wherein the second entry matches the first entry.

20 Claims, 17 Drawing Sheets

(51) Int. Cl.
*H04L 12/755* (2013.01)
*H04L 29/06* (2006.01)

(58) Field of Classification Search
USPC ........................................................ 709/223
See application file for complete search history.

(56) References Cited

U.S. PATENT DOCUMENTS

| | | |
|---|---|---|
| 4,921,898 A | 5/1990 | Lenney |
| 5,070,134 A | 12/1991 | Oyamada |
| 5,110,856 A | 5/1992 | Oyamada |
| 5,214,702 A | 5/1993 | Fischer |
| 5,377,354 A | 12/1994 | Scannell |
| 5,506,844 A | 4/1996 | Rao |
| 5,629,370 A | 5/1997 | Freidzon |
| 5,845,207 A | 12/1998 | Amin |
| 5,870,605 A | 2/1999 | Bracho |
| 6,047,331 A | 4/2000 | Medard |
| 6,052,683 A | 4/2000 | Irwin |
| 6,085,320 A | 7/2000 | Kaliski, Jr. |
| 6,091,724 A | 7/2000 | Chandra |
| 6,128,623 A | 10/2000 | Mattis |
| 6,128,627 A | 10/2000 | Mattis |
| 6,173,364 B1 | 1/2001 | Zenchelsky |
| 6,209,003 B1 | 3/2001 | Mattis |
| 6,226,618 B1 | 5/2001 | Downs |
| 6,233,617 B1 | 5/2001 | Rothwein |
| 6,233,646 B1 | 5/2001 | Hahm |
| 6,289,358 B1 | 9/2001 | Mattis |
| 6,292,880 B1 | 9/2001 | Mattis |
| 6,332,158 B1 | 12/2001 | Risley |
| 6,363,067 B1 | 3/2002 | Chung |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,862,280 B1 | 3/2005 | Bertagna |
| 6,901,452 B1 | 5/2005 | Bertagna |
| 6,915,307 B1 | 7/2005 | Mattis |
| 6,917,985 B2 | 7/2005 | Madruga |
| 6,957,228 B1 | 10/2005 | Graser |
| 6,968,393 B1 | 11/2005 | Chen |
| 6,981,029 B1 | 12/2005 | Menditto |
| 7,007,024 B2 | 2/2006 | Zelenka |
| 7,013,389 B1 | 3/2006 | Srivastava |
| 7,031,308 B2 | 4/2006 | Garcia-Luna-Aceves |
| 7,043,637 B2 | 5/2006 | Bolosky |
| 7,061,877 B1 | 6/2006 | Gummalla |
| 7,080,073 B1 | 7/2006 | Jiang |
| RE39,360 E | 10/2006 | Aziz |
| 7,149,750 B2 | 12/2006 | Chadwick |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,535,926 B1 | 5/2009 | Deshpande |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,636,767 B2 | 12/2009 | Lev-Ran |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,069 B2 | 9/2010 | Cheung |
| 7,801,177 B2 | 9/2010 | Luss |
| 7,816,441 B2 | 10/2010 | Elizalde |
| 7,831,733 B2 | 11/2010 | Sultan |
| 7,873,619 B1 | 1/2011 | Faibish |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devireddy |
| 7,979,912 B1 | 7/2011 | Roka |
| 8,000,267 B2 | 8/2011 | Solis |
| 8,010,691 B2 | 8/2011 | Kollmansberger |
| 8,069,023 B1 | 11/2011 | Frailong |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,271,687 B2 | 9/2012 | Turner |
| 8,312,064 B1 | 11/2012 | Gauvin |
| 8,332,357 B1 | 12/2012 | Chung |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |

(56) References Cited

U.S. PATENT DOCUMENTS

| | | |
|---|---|---|
| 8,972,969 B2 | 3/2015 | Gaither |
| 8,977,596 B2 | 3/2015 | Montulli |
| 9,002,921 B2 | 4/2015 | Westphal |
| 9,032,095 B1 | 5/2015 | Traina |
| 9,071,498 B2 | 6/2015 | Beser |
| 9,112,895 B1 | 8/2015 | Lin |
| 9,137,152 B2 | 9/2015 | Xie |
| 9,253,087 B2 | 2/2016 | Zhang |
| 9,270,598 B1 | 2/2016 | Oran |
| 9,280,610 B2 | 3/2016 | Gruber |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Peterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0218548 A1 | 11/2004 | Kennedy |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0238050 A1 | 10/2005 | Pung |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082662 A1 | 4/2008 | Dandliker |
| 2008/0095159 A1 | 4/2008 | Suzuki |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0291923 A1 | 11/2008 | Back |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |

(56) References Cited

U.S. PATENT DOCUMENTS

| | | |
|---|---|---|
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz |
| 2012/0047361 A1 | 2/2012 | Erdmann |
| 2012/0066727 A1 | 3/2012 | Nozoe |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0300669 A1 | 11/2012 | Zahavi |
| 2012/0307629 A1 | 12/2012 | Vasseur |
| 2012/0314580 A1 | 12/2012 | Hong |
| 2012/0317307 A1 | 12/2012 | Ravindran |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |

(56) References Cited

U.S. PATENT DOCUMENTS

| | | |
|---|---|---|
| 2013/0073552 A1 | 3/2013 | Rangwala |
| 2013/0073882 A1 | 3/2013 | Inbaraj |
| 2013/0074155 A1 | 3/2013 | Huh |
| 2013/0090942 A1 | 4/2013 | Robinson |
| 2013/0091539 A1 | 4/2013 | Khurana |
| 2013/0110987 A1 | 5/2013 | Kim |
| 2013/0111063 A1 | 5/2013 | Lee |
| 2013/0128786 A1 | 5/2013 | Sultan |
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0262698 A1 | 10/2013 | Schwan |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0033193 A1 | 1/2014 | Palaniappan |
| 2014/0036918 A1* | 2/2014 | Varvello ............... H04L 45/306 370/392 |
| 2014/0040505 A1 | 2/2014 | Barton |
| 2014/0040628 A1 | 2/2014 | Fort |
| 2014/0043987 A1 | 2/2014 | Watve |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0089721 A1* | 3/2014 | Gopalkrishna ............ G06F 1/10 713/501 |
| 2014/0096249 A1 | 4/2014 | Dupont |
| 2014/0098685 A1 | 4/2014 | Shattil |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker et al. |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0181140 A1 | 6/2014 | Kim |
| 2014/0192677 A1 | 7/2014 | Chew |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0204945 A1 | 7/2014 | Byun |
| 2014/0214942 A1 | 7/2014 | Ozonat |
| 2014/0233575 A1 | 8/2014 | Xie |
| 2014/0237085 A1 | 8/2014 | Park |
| 2014/0237095 A1 | 8/2014 | Bevilacqua-Linn |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0254347 A1* | 9/2015 | Mosko ............... G06F 17/30864 370/392 |
| 2015/0279348 A1 | 10/2015 | Cao |
| 2015/0288755 A1 | 10/2015 | Mosko |
| 2015/0312300 A1 | 10/2015 | Mosko |
| 2015/0349961 A1 | 12/2015 | Mosko |
| 2015/0372903 A1 | 12/2015 | Hui |
| 2015/0381546 A1 | 12/2015 | Mahadevan |
| 2016/0019275 A1 | 1/2016 | Mosko |
| 2016/0021172 A1 | 1/2016 | Mahadevan |
| 2016/0062840 A1 | 3/2016 | Scott |
| 2016/0110466 A1 | 4/2016 | Uzun |
| 2016/0171184 A1 | 6/2016 | Solis |

FOREIGN PATENT DOCUMENTS

| | | |
|---|---|---|
| EP | 0757065 A2 | 7/1996 |
| EP | 1077422 A2 | 2/2001 |
| EP | 1383265 A1 | 1/2004 |
| EP | 1384729 A1 | 1/2004 |
| EP | 1473889 A2 | 11/2004 |
| EP | 2120402 | 11/2009 |
| EP | 2120419 | 11/2009 |
| EP | 2120419 A2 | 11/2009 |
| EP | 2124415 A2 | 11/2009 |
| EP | 2214357 A1 | 8/2010 |
| EP | 2299754 A1 | 3/2011 |
| EP | 2323346 | 5/2011 |
| EP | 2552083 | 1/2013 |
| EP | 2214356 | 5/2016 |
| WO | 03005288 A2 | 1/2003 |
| WO | 03042254 A1 | 5/2003 |

(56) References Cited

FOREIGN PATENT DOCUMENTS

| | | |
|---|---|---|
| WO | 03049369 A2 | 6/2003 |
| WO | 03091297 A1 | 11/2003 |
| WO | 2005041527 | 5/2005 |
| WO | 2007113180 A1 | 10/2007 |
| WO | 2007122620 | 11/2007 |
| WO | 2007144388 A1 | 12/2007 |
| WO | 2011049890 A1 | 4/2011 |
| WO | 2012077073 A1 | 6/2012 |
| WO | 2013123410 | 8/2013 |
| WO | 2015084327 | 6/2015 |

OTHER PUBLICATIONS

Koponen, Teemu et al., "A Data-Oriented (and Beyond) Network Architecture", SIGCOMM '07, Aug. 27-31, 2007, Kyoto, Japan, XP-002579021, p. 181-192.
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, 1 Jun. 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/.downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "Conet: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
B. Ahlgren et al., 'A Survey of Information-centric Networking' IEEE Commun. Magazine, Jul. 2012, pp. 26-36.
"PBC Library-Pairing-Based Cryptography-About," http://crypto.stanford.edu/pbc. downloaded Apr. 27, 2015.
Bari, MdFaizul, et al. 'A survey of naming and routing in information-centric networks.' Communications Magazine, IEEE 50.12 (2012): 44-53.

Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C. Gentry and A. Silverberg. Hierarchical ID-Based Cryptography. Advances in Cryptology—ASIACRYPT 2002. Springer Berlin Heidelberg (2002).
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
Boneh et al., "Collusion Resistant Broadcast Encryption With Short Ciphertexts and Private Keys", 2005.
D. Boneh and M. Franklin. Identity-Based Encryption from the Weil Pairing. Advances in Cryptology—CRYPTO 2001, vol. 2139, Springer Berlin Heidelberg (2001).
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
Anteniese et al., "Improved Proxy Re-Encryption Schemes with Applications to Secure Distributed Storage", 2006.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.

(56) References Cited

OTHER PUBLICATIONS

Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Xiong et al., "CloudSeal: End-to-End Content Protection in Cloud-based Storage and Delivery Services", 2012.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012}.
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Bethencourt, A, Saha!, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer Science vol. 5443 (2009).
V. Jacobson et al., 'Networking Named Content,' Proc. IEEE CoNEXT '09, Dec. 2009.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
Gopal et al. "Integrating content-based Mechanisms with hierarchical File systems", Feb 1999, University of Arizona, 15 pages.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE-A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).

(56) References Cited

OTHER PUBLICATIONS

S. Chow, J. Weng, Y. Yang, and R. Deng. Efficient Unidirectional Proxy Re-Encryption. Progress in Cryptology-AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOMM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/ documents/ Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Mini-conference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOMM 2012 (2012).
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al.,"DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 (2014): 66-73.
Soh et al., "Efficient Prefix Updates for IP Router Using Lexicographic Ordering and Updateable Address Set" Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network and Computer Applications 35 (2012) 221-229.
D. Trossen and G. Parisis, "Designing and realizing and information-centric internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
J. Lotspiech, S. Nusser, and F. Pestoni. Anonymous Trust: Digit.
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryptographic Cloud Storage. Financial Cryptography and Data Security. Springer Berlin Heidelberg (2010).

(56) References Cited

OTHER PUBLICATIONS

RTMP (2009). Available online at http://wwwimages.adobe.com/www.adobe.com/content/dam/Adobe/en/devnet/rtmp/pdf/rtmp specification 1.0.pdf.

Hoque et al., "NLSR: Named-data Link State Routing Protocol", Aug. 12, 2013, ICN'13.

Nadeem Javaid, "Analysis and design of quality link metrics for routing protocols in Wireless Networks", PhD Thesis Defense, Dec. 15, 2010, Universete Paris-Est.

Wetherell, David, "Active Network vision and reality: Lessons form a capsule-based system", ACM Symposium on Operating Systems Principles, Dec. 1, 1999. pp. 64-79.

Kulkarni A.B. et al., "Implementation of a prototype active network", IEEE, Open Architectures and Network Programming, Apr. 3, 1998, pp. 130-142.

Xie et al. "Collaborative Forwarding and Caching in Content Centric Networks", Networking 2012.

Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).

Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.

Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.

Tiancheng Zhuang et al. "Managing Ad Hoc Networks of Smartphones", International Journal of Information and Education Technology, Oct. 1, 2013.

Amadeo et al. "Design and Analysis of a Transport-Level Solution for Content-Centric VANETs", University "Mediterranea" of Reggio Calabria, Jun. 15, 2013.

Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf *paragraphs [01.3], [002], [02.1], [0003].

Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, "Paragraph [002]" "figure 1".

Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016] * paragraphs [003]-[006], [0011], [0013]* * figures 1,2*.

Marc Mosko et al "All-In-One Streams for Content Centric Networks", May 24, 2015, retrieved from the Internet: http://www.ccnx.org/pubs/AllinOne.pdf [downloaded Jun. 9, 2016] *the whole document*.

Cesar Ghali et al. "Elements of Trust in Named-Data Networking", Feb. 13, 2014 Retrieved from the internet Jun. 17, 2016 http://arxiv.org/pdf/1402.3332v5.pdf * p. 5, col. 1* * p. 2, col. 1-2* * Section 4.1; p. 4, col. 2* * Section 4.2; p. 4, col. 2*.

Priya Mahadevan et al. "CCN-KRS", Proceedings of the 1st International Conference on Information-Centric Networking, Inc. '14, Sep. 24, 2014.

Flavio Roberto Santos Et al. "Funnel: Choking Polluters in BitTorrent File Sharing Communities", IEEE Transactions on Network and Service Management, IEEE vol. 8, No. 4, Dec. 1, 2011.

Liu Wai-Xi et al: "Multisource Dissemination in content-centric networking", 2013 Fourth International conference on the network of the future (NOF), IEEE, Oct. 23, 2013, pp. 1-5.

Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.

Asokan et al.: "Server-Supported Signatures", Computer Security Esorics 96, Sep. 25, 1996, pp. 131-143, Section 3.

Mandl et al.: "A Fast FPGA Based Coprocessor Supporting Hard Real-Time Search", New Frontiers of Information Technology, Proceedings of the 23rd Euromicro Conference Budapest, Sep. 1, 1997, pp. 499-506 *The Whole Document*.

Sun et al.: "Content-Based Route Lookup Using CAMs", Global Communications Conference, IEEE, Dec. 3, 2012 *The Whole Document*.

Gelenbe et al.: "Networks With Cognitive Packets", Modeling, Analysis and Simulation of Computer and Telecommunication Systems, 2000. IEEE, Aug. 29, 2000, pp. 3-10.

Vangelis et al.: "On the Role of Semantic Descriptions for Adaptable Protocol Stacks in the Internet of Things", 2014 28th International Conference on Advanced Information Networking and Applications Workshops, IEEE, May 13, 2014, pp. 437-443, *last paragraph of section II.B*.

* cited by examiner

```
Name of Data    Cache Location
302             304
--------------------------------
311{  /parc/printer    Local
312{  /parc/calendar   Supervisor
313{  /parc/documents  Line Card 14
314{  /parc/services   { Local, Line Card 8 }
      ...
```

NAMED DATA CACHE LOCATION TABLE 300

FIG. 3A

```
Name of Data    Cache Location
322             324
--------------------------------
      /parc/printer    Local
      /parc/calendar   Supervisor
      /parc/documents  Line Card 14
321{  /parc/services   Local
322{  /parc/services   Line Card 8
      ...
```

NAMED DATA CACHE LOCATION TABLE 320

FIG. 3B

CACHE MANAGEMENT ON HIGH AVAILABILITY ROUTERS IN A CONTENT CENTRIC NETWORK

RELATED APPLICATIONS

The subject matter of this application is related to the subject matter in the following applications:

U.S. patent application Ser. No. 13/847,814, entitled "ORDERED-ELEMENT NAMING FOR NAME-BASED PACKET FORWARDING," by inventor Ignacio Solis, filed 20 Mar. 2013 (hereinafter "U.S. patent application Ser. No. 13/847,814"); and U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338,175");

the disclosures of which are herein incorporated by reference in their entirety.

BACKGROUND

Field

This disclosure is generally related to distribution of digital content. More specifically, this disclosure is related to cache management on high availability routers in a content centric network.

Related Art

The proliferation of the Internet and e-commerce continues to create a vast amount of digital content. Content centric network (CCN) architectures have been designed to facilitate accessing and processing such digital content. A CCN includes entities, or nodes, such as network clients, forwarders (e.g., routers), and content producers, which communicate with each other by sending interest packets for various content items and receiving content object packets in return. CCN interests and content objects are identified by their unique names, which are typically hierarchically structured variable length identifiers (HSVLI). An HSVLI can include contiguous name components ordered from a most general level to a most specific level.

A CCN entity (such as a router) typically maintains three data structures: a pending interest table (PIT) to track incoming and pending requests for data; a forwarding information base (FIB) which determines interfaces on which to forward a packet; and a cache or a content store (CS) for storing data which may be retrieved in response to an interest. Typical CCN communication is described in U.S. patent application Ser. No. 13/847,814. While current CCN protocols specify that a router may store received content in its CS, the current CCN protocols do not specify where or how to store the content in a high availability router, i.e., in a router with multiple intelligent network line cards which are connected to a supervisor card via dedicated lanes through a fabric. Nor do current CCN protocols specify how to subsequently access such stored content in a high availability router.

SUMMARY

One embodiment provides a forwarding device, comprising a plurality of components, including one or more line cards and a supervisor card, wherein the components perform a method. An ingress card of the forwarding device receives a content object with a name. In response to determining a distributed storage technique, a selected line card stores the content object in a location which is a cache of the selected line card. The selected line card creates a first entry in a table of the selected line card, wherein the first entry indicates the content object name and the location in which the content object is stored. The selected line card transmits a first notification message to other components, wherein the first notification message indicates the content object name and the location indicated in the first entry. A respective other component creates a second entry in a table for the respective other component, wherein the second entry matches the first entry.

In some embodiments, the selected line card is one or more of the ingress line card and an egress line card. If the selected line card is the egress line card, the ingress line card transmits the content object to the egress line card. If the selected line card is both the ingress line card and the egress line card: storing the content object, creating the first entry, and transmitting the first notification message are performed by the ingress line card; and storing the content object, creating the first entry, and transmitting the first notification message are performed by the egress line card.

In some embodiments, the selected line card marks the first entry as active, and multicasts the first notification message to the other components.

In some embodiments, the selected line card marks the first entry as inactive. The selected line card transmits to the supervisor card a request to cache the content object at the location. In response to accepting, by the supervisor card, the request to cache the content object at the location: the supervisor card multicasts the first notification message to the other components; the selected line card marks the first entry as active; and the respective other component creates the second entry in the table for the respective other component.

In some embodiments, in response to not accepting, by the supervisor card, the request to cache the content object at the location, the selected line card removes the first entry from the table of the selected line card based on a timeout of the first entry.

In some embodiments, in response to determining a centralized storage technique, the ingress line card transmits the content object to the supervisor card. The supervisor card stores the content object in a central location which is associated with the supervisor card. The supervisor card creates a third entry in a table of the supervisor card, wherein the third entry indicates the content object name and further indicates the supervisor card as the central location in which the content object is stored. The supervisor card transmits a second notification message to the other components, wherein the second notification message indicates the content object name and the location indicated in the third entry. A respective other component creates a fourth entry in a table for the respective other component, wherein the fourth entry matches the third entry.

In some embodiments, the central location is one or more of: a cache on the supervisor card; an external storage device attached to the supervisor card; an external storage device attached to a line card; and a dedicated line card for storage, wherein the dedicated line card is accessed only by the supervisor card.

In some embodiments, if the central location is the external storage device attached to the supervisor card, the external storage device attached to the line card, or the dedicated line card for storage, the supervisor card transmits the content object to the central location.

In some embodiments, the external storage device attached to the line card or the dedicated line card for storage creates the third entry in a table of the external storage device attached to the line card or the dedicated line card for storage. The external storage device attached to the line card or the dedicated line card for storage transmits the second notification message to the other components.

In some embodiments, transmitting the second notification message further comprises multicasting, by the supervisor card, the second notification message to the other components.

BRIEF DESCRIPTION OF THE FIGURES

FIG. 3A illustrates an exemplary named data cache location table, in accordance with an embodiment of the present invention.

FIG. 3B illustrates an exemplary named data cache location table, including multiple entries for the same named data, in accordance with an embodiment of the present invention.

In the figures, like reference numerals refer to the same figure elements.

DETAILED DESCRIPTION

Figure 1A:
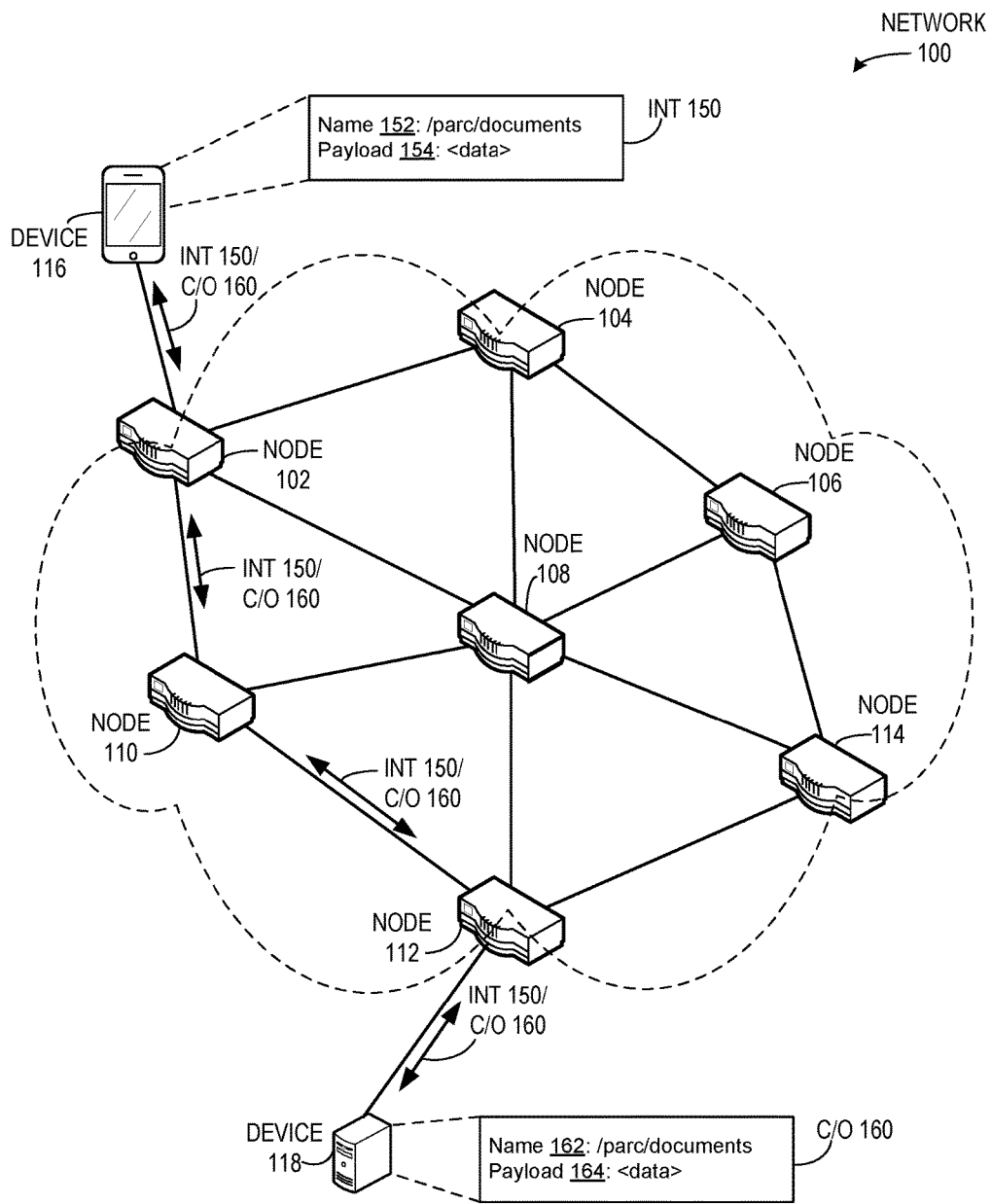
FIG. 1A illustrates an exemplary network which facilitates cache management on high availability routers in a content centric network, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system which facilitates efficient cache management of high availability routers in a content centric network (CCN). A CCN entity (such as a router) typically maintains three data structures: a pending interest table (PIT) to track incoming and pending requests for data; a forwarding information base (FIB) which determines interfaces on which to forward a packet; and a cache or a content store (CS) for storing data which may be retrieved in response to an interest. CCN communication is described in U.S. patent application Ser. No. 13/847,814.

A typical high availability router (such as a carrier-class router) may offer terabits of switching capacity, and can include multiple components, including intelligent network line cards which are connected to a supervisor card or a control card via dedicated lanes through the fabric. A line card which receives content in from another device is referred to as an ingress line card, and a line card which transmits content out to another device is referred to as an egress line card. Content can include a CCN packet (e.g., interests and content objects), where a packet has a name ("named data"). A line card can serve as both an ingress and an egress line card for a CCN packet.

Current CCN protocols do not specify where and how to store content in the router, or specifically, in the CS of the router. Nor do current CCN protocols specify how to subsequently access such stored content in a high availability router. Embodiments of the present invention provide a system which allows a high availability router in a CCN to store named data based on either a distributed or a centralized manner, and associated with components (e.g., line cards or a supervisor card) of the router. The system also provides inter-component notification of where incoming content is stored, and component-specific tables which map named data to its stored location. This allows the system to subsequently receive and process an incoming interest. That is, an ingress line card which receives an interest with a name (i.e., named data) can access the requested content by performing a lookup in the component-specific table for the named data to obtain the corresponding cache location, and subsequently send the interest to the listed component to retrieve the requested content.

In distributed cache management, content may be stored on an ingress line card, an egress line card, or both an ingress and an egress line card. Distributed cache management is described below in relation to FIGS. 4A-4B. In centralized cache management, content may be stored in one of four locations, which are each associated with the supervisor card: (a) a cache on the supervisor card; (b) an external storage device attached to the supervisor card; (c) an external storage device attached to a line card; and (d) a dedicated line card for storage, where the dedicated line card can only be accessed by the supervisor card. Distributed cache management is described below in relation to FIGS. 5A-5C.

Thus, the present system provides improvements to the distribution of digital content, where the improvements are fundamentally technological. Embodiments of the present invention provide a technological solution (e.g., caching content in various locations associated with a high availability router based on a distributed or a centralized manner, providing inter-component notification of where content is cached, and maintaining component-specific tables which map named data to its cache location) to the technological problem of the efficient, secure, and effective distribution and storage of digital content.

In CCN, each piece of content is individually named, and each piece of data is bound to a unique name that distinguishes the data from any other piece of data, such as other versions of the same data or data from other sources. This unique name allows a network device to request the data by disseminating a request or an interest that indicates the unique name, and can obtain the data independent from the data's storage location, network location, application, and means of transportation. The following terms are used to describe the CCN architecture:

Content Object (or "content object"): A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document. The HSVLI can also include contiguous name components ordered from a most general level to a most specific level, and a name prefix can be one or more of the contiguous name components beginning from the most general level.

In some embodiments, the name can include an identifier, such as a hash value that is derived from the Content Object's data (e.g., a checksum value) and/or from elements of the Content Object's name. A description of a hash-based name is described in U.S. patent application Ser. No. 13/847,814, which is herein incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest (or "interest"): A packet that indicates a request for a piece of data, and includes a name (or a name prefix) for the piece of data. A data consumer can disseminate a request or Interest across an information-centric network, which CCN/NDN routers can propagate toward a storage device (e.g., a cache server) or a data producer that can provide the requested data to satisfy the request or Interest.

Face or Interface (or "face" or "interface"): In CCN, the term "face" is a generalization of the concept of an interface. A face may be a connection to a network or directly to an application party. A face may be configured to send and receive broadcast or multicast packets on a particular network interface, or to send and receive packets using point-to-point addressing in the underlying transport, or using a tunnel (for example a TCP tunnel). A face may also be the connection to a single application process running on the same machine, via an encapsulation like UDP or an OS-specific inter-process communication path. All messages arrive through a face and are sent out through a face. In this disclosure, the term "neighbor" is interchangeable with the terms "face" and "interface," referring to an incoming or outgoing interface of an Interest.

"Prefix": In this disclosure, the term "prefix" can be used to refer to either a name of a specific content object or a name prefix for the content object. A routable name prefix can determine the routing of a packet that indicates a request for a piece of data, and includes a name (or a name prefix) for the piece of data. A data consumer can disseminate a request or interest across an information-centric network, which CCN/NDN routers can propagate toward a storage device (e.g., a cache server) or a data producer that can provide the requested data to satisfy the request or interest.

The methods disclosed herein are not limited to CCN networks and are applicable to other architectures as well. A description of a CCN architecture is described in U.S. patent application Ser. No. 12/338,175, which is herein incorporated by reference.

Exemplary Network and Communication

FIG. 1A illustrates an exemplary network 100 which facilitates cache management on high availability routers in a content centric network, in accordance with an embodiment of the present invention. Network 100 can include a consumer or content requesting device 116, a producer or content producing device 118, and a router or other forwarding device at nodes 102, 104, 106, 108, 110, 112, and 114. A forwarding device can be a router, a switch, or any computing device which can forward packets. A node can be a computer system, an end-point representing users, and/or a device that can generate interests or originate content. A node can also be an edge router (e.g., CCN nodes 102, 104, 112, and 114) or a core router (e.g., intermediate CCN routers 106, 108, and 110). Network 100 can be a content centric network. Recall that a CCN entity can maintain a pending interest table (PIT), a forwarding information base (FIB), and a content store (CS).

During operation, content requesting device 116 can generate an interest 150 with a name 152 of "/parc/documents" and an optional payload 154 of "<data>." Interest 150 can travel through network 100, via routers or nodes 102, 110, and 112, before reaching content producing device 118. A node which receives an interest can process the interest based on standard CCN rules. For example, upon receiving interest 150, node 110 can perform a CS lookup to see if the requested content is cached. If so, node 110 can return the cached content on a reverse path as interest 150. If not, node 110 can perform a PIT lookup to see if there is a matching interest for the requested content. If a matching PIT entry exists, node 110 can aggregate the arrival interface of interest 150 with the already existing arrival interfaces listed in the matching PIT entry. If a matching PIT entry does not exist, node 110 can perform a FIB lookup to obtain the next hop to which to forward interest 150. If there is a FIB entry, node 110 can create a new PIT entry and forward interest 150; if there is no FIB entry, node 110 can drop interest 150. Furthermore, upon aggregating the arrival interface and finding a matching FIB entry, node 110 can forward interest 150 via the next hop indicated in the matching FIB entry (e.g., via the interface corresponding to node 112).

Interest 150 can reach producer 118, which can perform the same processing as described above for node 110. Producer 118 can perform a lookup in its CS, determine a cache hit, and return a responsive content object 160 with a name 162 of "/parc/documents" and a payload 164 of "<data>." Producer 118 can transmit content object 160 through network 100 on a reverse path as interest 150, i.e., via nodes 112, 110, and 102, before reaching device 116. A node which receives a content object can process the content object based on standard CCN rules. For example, upon receiving content object 160, node 110 can perform a PIT lookup to see if there is a matching interest for the received content. If not, node 110 can drop content object 160. If there is a matching PIT entry, node 110 "consumes" the PIT entry by transmitting content object 160 via the arrival interfaces listed in the matching PIT entry.

Node 110 can also store content object 160 in its CS. Current CCN protocols do not specify how or where content object 160 may be stored. Embodiments of the present invention allow a router (such as node 110) to store named content (such as content object 160) in various ways, including a distributed manner and a centralized manner, as described below in relation to FIGS. 4A-4B and FIGS. 5A-5C, respectively.

Figure 1B:
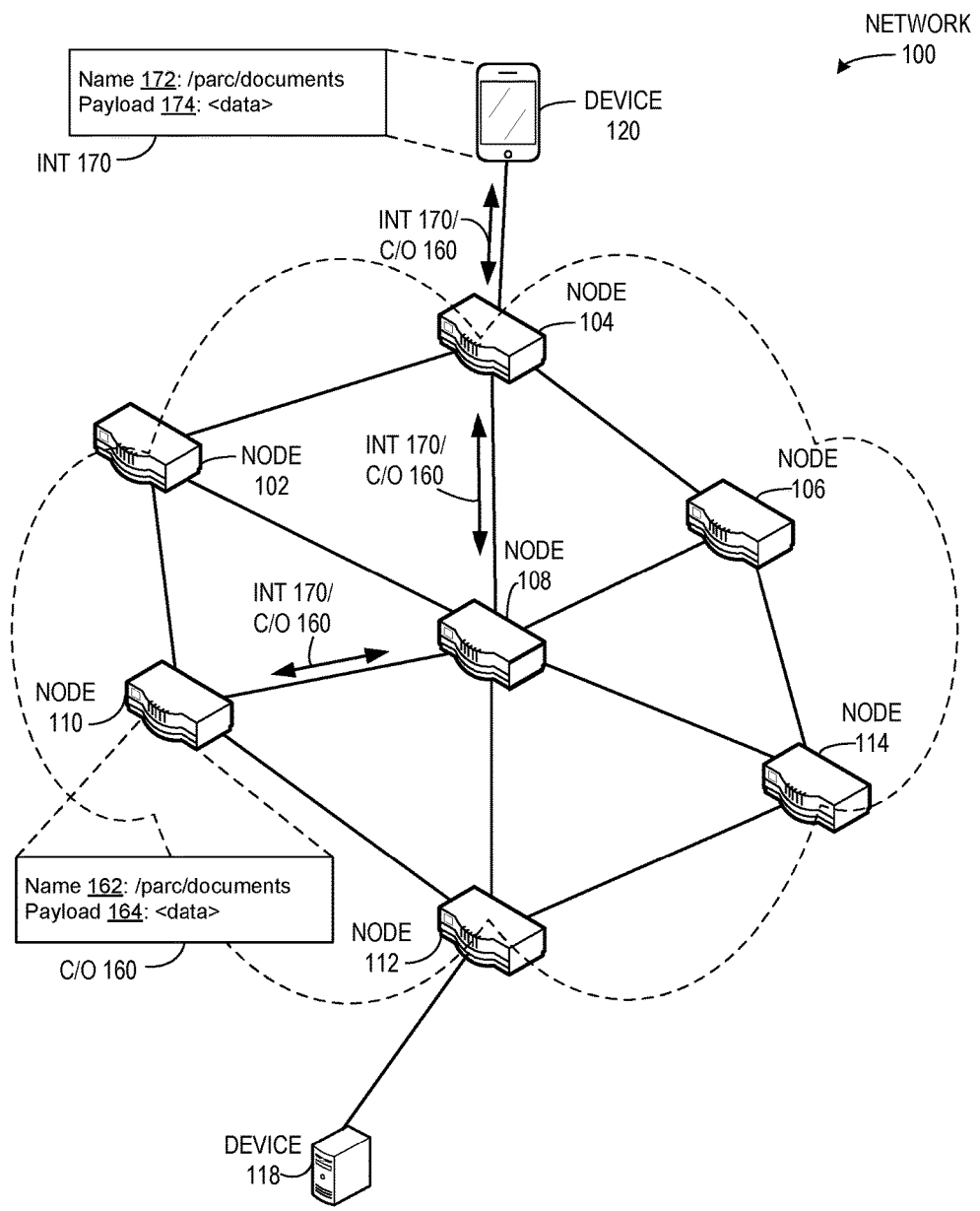
FIG. 1B illustrates an exemplary network which facilitates cache management on high availability routers in a content centric network, in accordance with an embodiment of the present invention.

FIG. 1B illustrates an exemplary network 100 which facilitates cache management on high availability routers in a content centric network, in accordance with an embodiment of the present invention. Subsequent to the communication of FIG. 2A, a node may receive an interest for content, where the requested content already exists in a CS of the node. For example, a consumer or content requesting device 120 can generate an interest 170 with a name 172 of "/parc/documents" and an optional payload 174 of "<data>." Interest 170 can travel through network 100, via intermediate routers or nodes 104, 108, and reach node 110. Node 110 can perform a lookup in its CS, determine a cache hit, and return a responsive content object 160 with a name 162 of "/parc/documents" and a payload 164 of "<data>." Recall that node 110 has previously stored content object 160 in its CS, as described in relation to FIG. 1A. Current CCN protocols do not specify how a stored content object is subsequently accessed. Embodiments of the present invention allow content to be stored by high availability routers (such as node 110) in various locations, as associated with components of the router (e.g., line cards or a supervisor card). The system also provides component-wide notification of where named data is stored so that the named data content may be subsequently retrieved. Upon retrieving content 160 from its CS, node 110 can transmit content object 160 through network 100 on a reverse path as interest 170, i.e., via nodes 108 and 104, before reaching device 120.

Exemplary High Availability Routers and Cache Locations

Figure 2A:
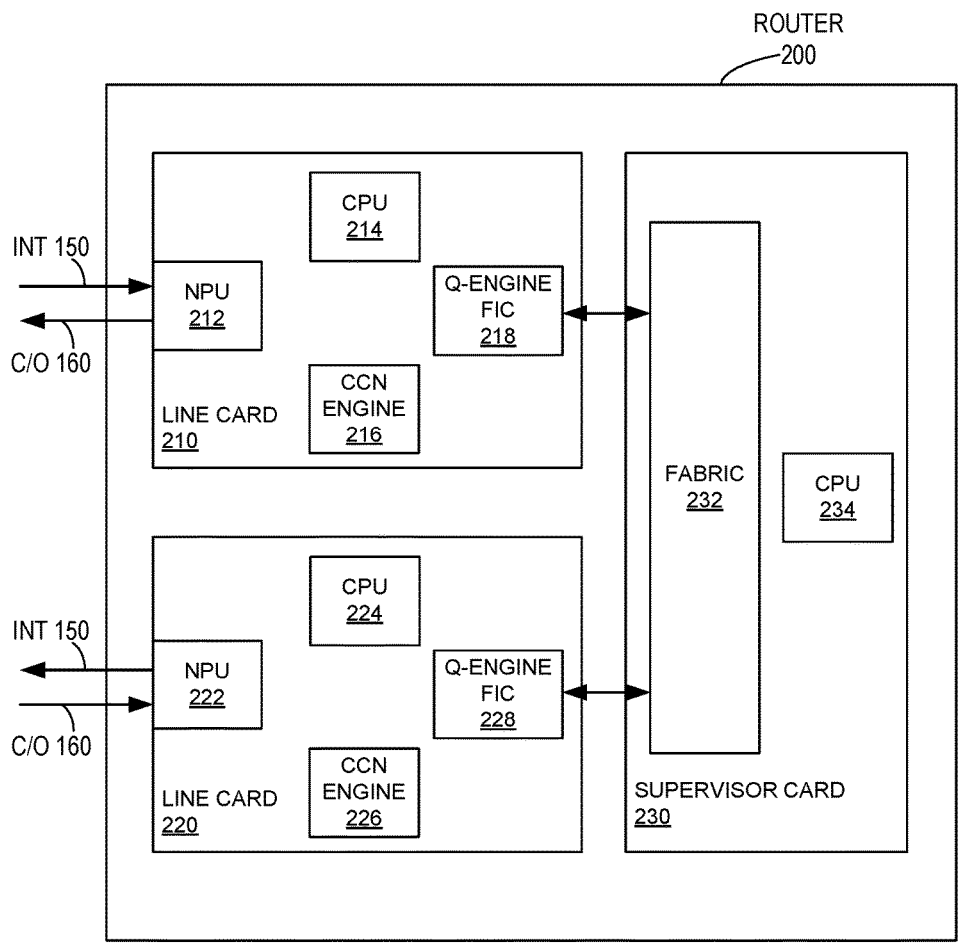
FIG. 2A illustrates an exemplary high availability router which facilitates cache management, in accordance with an embodiment of the present invention.

FIG. 2A illustrates an exemplary high availability router 200 which facilitates cache management, in accordance with an embodiment of the present invention. Router 200 can include multiple line cards (such as a line card 210 and a line card 220) and a supervisor card 230. Line card 210 can include: a network processing unit (NPU) 212 which includes outward facing media ports for receiving and transmitting data packets; a central processing unit (CPU) 214; a CCN engine 216 for performing CCN-related tasks, such as verifying and processing an interest or content object; and a Q-Engine FIC 218 which interfaces with supervisor card 230 via a fabric 232 of supervisor card 230. Supervisor card 230 can also include a CPU 234. Note that CCN engine 216 and CPU 214 are depicted as separate entities in line card 210. However, CCN processing may be folded into CPU 214. Router 200 depicts a sample configuration for a typical multi-card chassis router. Other configurations are possible. Furthermore, while router 200 depicts a single supervisor card 230, a high availability router typically includes multiple supervisor cards, one of which may serve as the active supervisor card (such as supervisor card 230) and the others which may be serve as standby cards (not depicted).

Line card 210 depicts the ingress of interest 150 and the egress of content object 160, while line card 220 depicts the egress of interest 150 and the ingress of content object 160. Note that a line card can serve as both an ingress and an egress line card for both interests and content objects. FIG. 2A depicts line card 210 as the interest ingress and the content egress, and depicts line card 220 as the interest egress and the content ingress, as an example only.

Figure 2B:
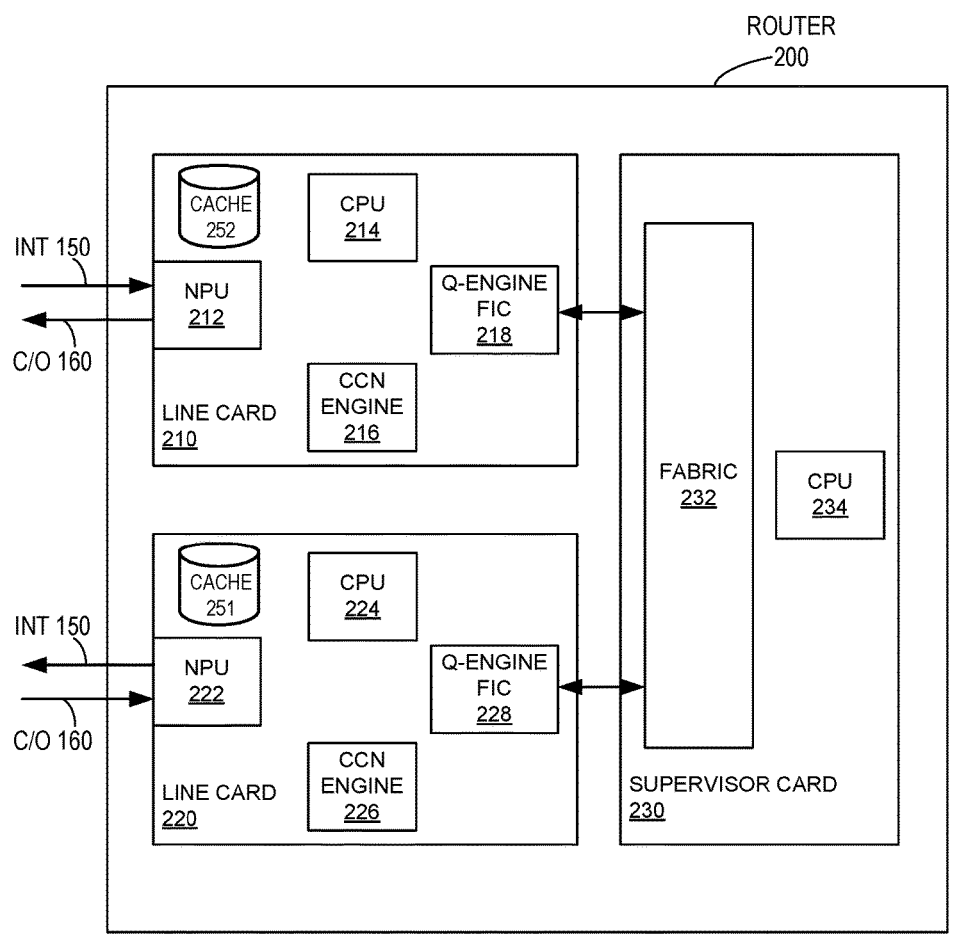
FIG. 2B illustrates an exemplary high availability router which facilitates cache management, including distributed cache management, in accordance with an embodiment of the present invention.

FIG. 2B illustrates an exemplary high availability router 200 which facilitates cache management, including distributed cache management, in accordance with an embodiment of the present invention. In distributed cache management, the cache can reside on an ingress line card, an egress line card, or both the ingress line card and the egress line card. Router 200 can include a cache 251 on line card 220, which corresponds to an ingress line card cache for content object 160. Router 200 can include a cache 252 on line card 210, which corresponds to an egress line card cache for content object 160. Router 200 can also include both cache 251 and cache 252. Distributed cache management is described below in relation to FIGS. 4A and 4B.

Figure 2C:
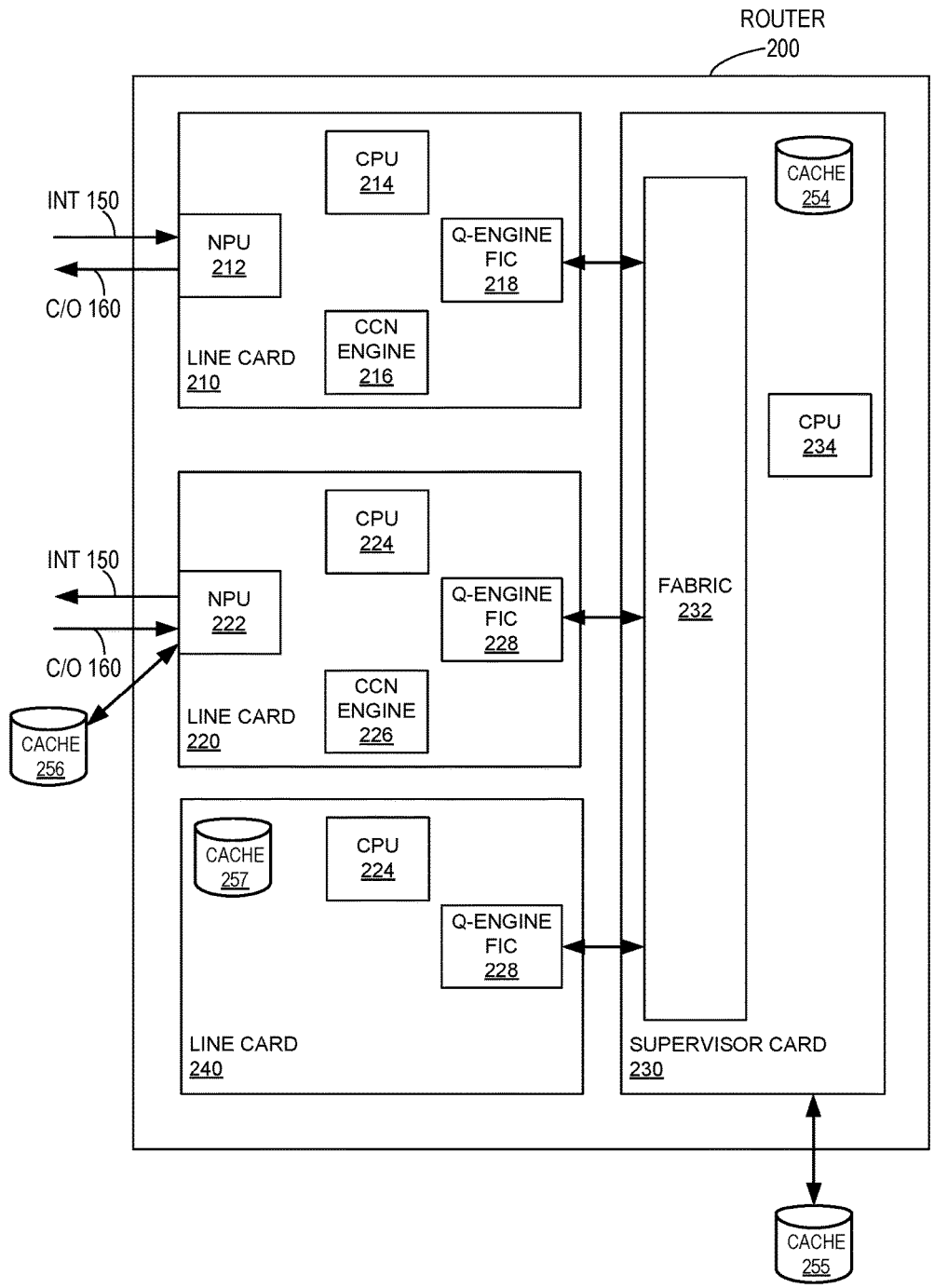
FIG. 2C illustrates an exemplary high availability router which facilitates cache management, including centralized cache management, in accordance with an embodiment of the present invention.

FIG. 2C illustrates an exemplary high availability router 200 which facilitates cache management, including centralized cache management, in accordance with an embodiment of the present invention. In centralized cache management, the cache can reside on the supervisor card, an external storage device attached to the supervisor card, an external storage device attached to a line card, or a dedicated line card which has no front face. Router 200 can include a cache 254 on supervisor card 230. Router 200 can include a cache 255 which is an external storage device attached to supervisor card 230. Router 200 can include a cache 256 which is an external storage device attached to line card 220. Router 200 can include a cache 257 on a dedicated line card 240 with no front face and only a connection to supervisor card 230 via fabric 232.

Figure 2D:
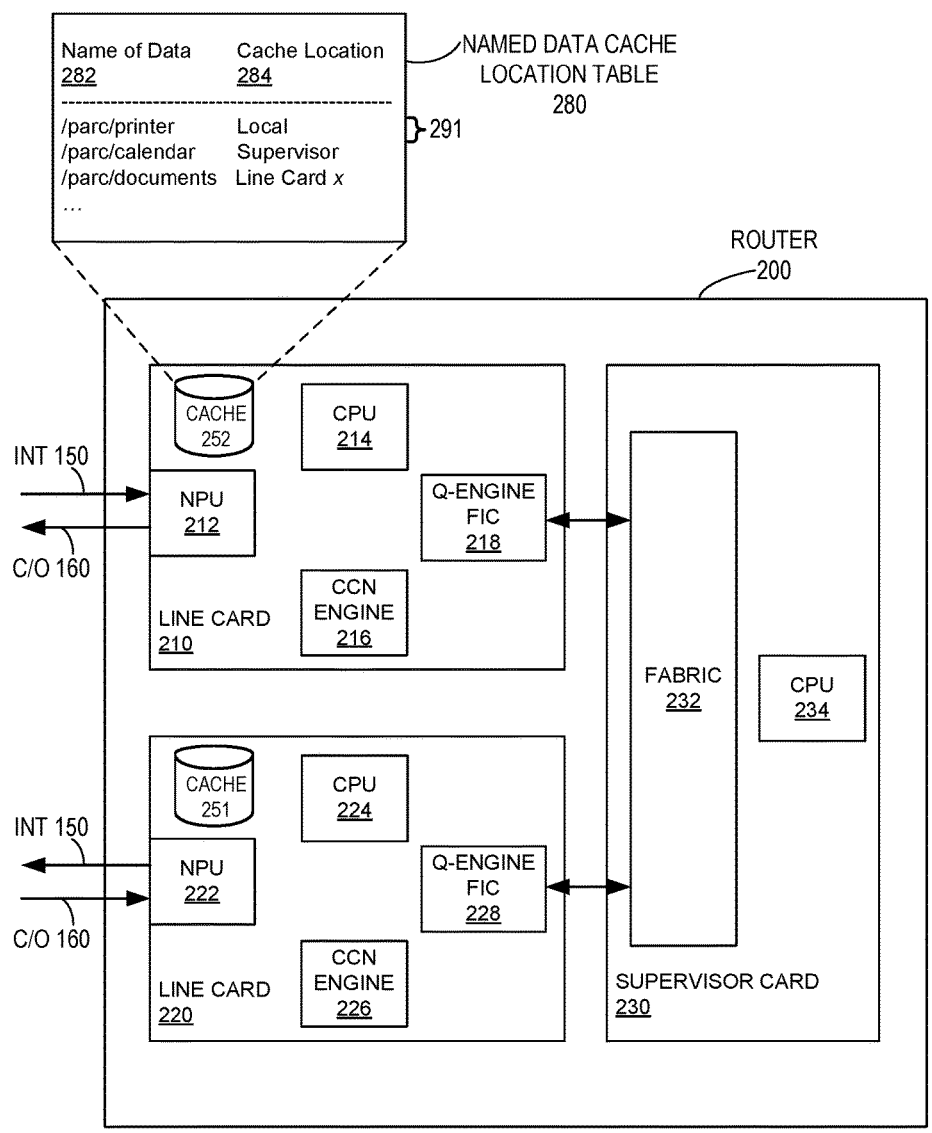
FIG. 2D illustrates an exemplary high availability router which facilitates cache management, including an exemplary named data cache location table, in accordance with an embodiment of the present invention.

FIG. 2D illustrates an exemplary high availability router which facilitates cache management, including an exemplary named data cache location table, in accordance with an embodiment of the present invention. Line card 210 can include a named data cache location table 280. Table 280 can reside in cache 252 as depicted, or can reside elsewhere on line card 210. Table 280 can include entries with a name of data 282 and a cache location 284. Location 284 can indicate one of several values: "Local" indicates that the named data is stored on that local line card; "Supervisor" indicates that the named data is stored on the supervisor card; and "Line Card x" indicates that the named data is stored on Line Card x. Each router component can maintain its own copy of the named data cache location table, regardless of whether a respective component stores any content (i.e., any named data included in the named data cache location table) in its cache. Furthermore, in this disclosure, a first entry "matches" a second entry when the location indicates the same location. For example, named data cache location table 280 of line card 210 includes a first entry 291 for named data "/parc/printer" with a location of "Local," which indicates Line Card 210. A second entry in a named data cache location table of line card 220 is said to "match" entry 291 if the second entry includes a cache location of "Line Card 210" (not shown).

Exemplary Named Data Cache Location Tables

FIG. 3A illustrates an exemplary named data cache location table 300, in accordance with an embodiment of the present invention. Table 300 can include entries with a name of data (or "data name") 302 and a cache location 304. For example: entry 311 can include a data name "/parc/printer" and a cache location of "Local"; entry 312 can include a data name "/parc/calendar" and a cache location of "Supervisor"; and entry 313 can include a data name "/parc/documents" and a cache location of "Line Card 14."

In some embodiments, multiple interests for the same content may be re-routed due to routing changes, which may result in multiple copies of the content being received and stored in multiple locations. Thus, table 300 can include entries with multiple locations. For example, entry 314 can include a data name of "/parc/services" and a cache location of "{Local, Line Card 8}."

FIG. 3B illustrates an exemplary named data cache location table 320, including multiple entries for the same named data, in accordance with an embodiment of the present invention. Table 320 can include entries with a data 322 and a cache location 324. Table 320 can indicate multiple entries for the same named data. For example, table 320 can include entry 321 with a data name "/parc/services" and a cache location of "Local," and table 320 can also include an entry 322 with a data name "/parc/services" and a cache location of "Line Card 8."

High Availability Router Facilitates Distributed Cache Management

Figure 4A:
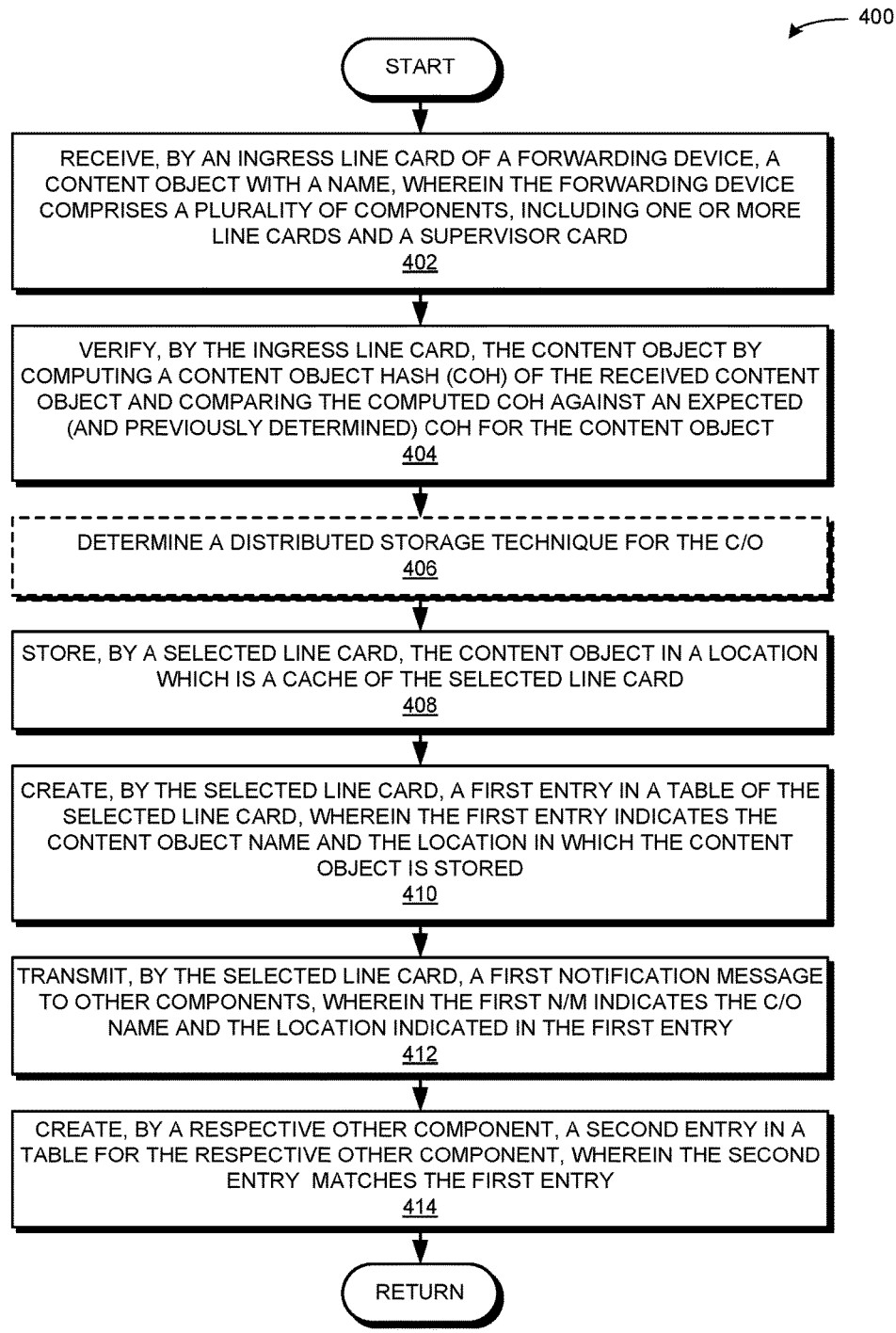
FIG. 4A presents a flow chart illustrating a method for processing a content object, including distributed cache management, in accordance with an embodiment of the present invention.

FIG. 4A presents a flow chart 400 illustrating a method for processing a content object, including distributed cache management, in accordance with an embodiment of the present invention. During operation, the system receives, by an ingress line card of a forwarding device, a content object with a name, wherein the forwarding device comprises a plurality of components, including one or more line cards and a supervisor card (operation 402). The system verifies, by the ingress line card, the content object by computing a content object hash (COH) value of the received content object and comparing the computed COH value against an expected (and previously determined) COH for the content object (operation 404). The system optionally determines a distributed storage technique for the content object (operation 406). The system stores, by a selected line card, the content object in a location which is a cache of the selected line card (operation 408). The selected line card can be the ingress line card, an egress line card, or both the ingress and the egress line card. The system creates, by the selected line card, a first entry in a table of the selected line card, wherein the first entry indicates the content object name and the location in which the content object is stored (operation 410). The system transmits, by the selected line card, a first notification message to other components, wherein the first notification message indicates the content object name and the location indicated in the first entry (operation 412). Subsequently, the system creates, by a respective other component, a second entry in a table for the respective other component, wherein the second entry matches the first entry (operation 414). This facilitates CCN cache management on a high availability router.

Figure 4B:
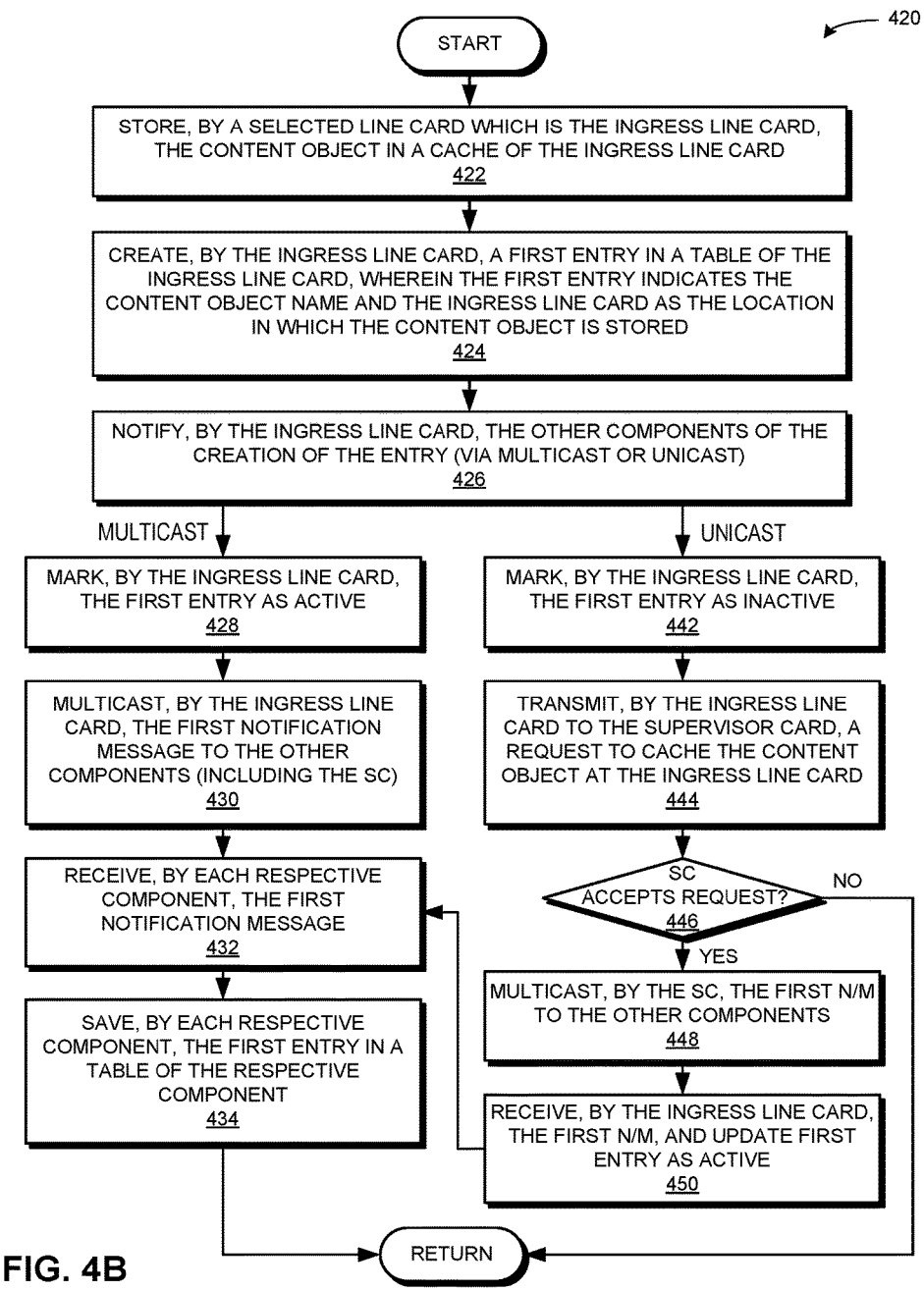
FIG. 4B presents a flow chart illustrating a method for processing a content object, including distributed cache management and distribution methods, in accordance with an embodiment of the present invention.

FIG. 4B presents a flow chart 420 illustrating a method for processing a content object, including distributed cache management via an ingress line card and distribution methods, in accordance with an embodiment of the present invention. Flow chart 420 assumes that the system (via the ingress line card) has already received and verified the content object (operations 402 and 404 of FIG. 4A), and optionally determines a distributed storage technique for the content object (operation 406 of FIG. 4A). During operation, the system stores, by a selected line card which is the ingress line card, the content object in a cache of the ingress line card (operation 422). The system creates, by the ingress line card, a first entry in a table of the ingress line card, wherein the first entry indicates the content object name and the ingress line card as the location in which the content is stored (e.g., "Local") (operation 424). The system notifies, by the ingress line card, the other components of the creation of the first entry, via a multicast or a unicast method (operation 426).

The system can multicast the notification of the creation of the first entry. The system marks, by the ingress line card, the first entry as active (operation 428). The system multicasts, by the ingress line card, the first notification message to the other components (including the supervisor card) (operation 430). The supervisor card is not only one of the "other" components which receives the notification message, but is also notified in a specific way regardless of whether the system caches content in a distributed or a centralized manner, and also regardless of whether the notification message is distributed via multicast or unicast. Thus, the supervisor card always possesses the most current and up-to-date version of the table, which allows the supervisor card to provide redundancy in the system.

The system receives, by each respective other component, the first notification message (operation 432). A respective other component can receive the notification message and send it to its local CCN Engine (e.g., CCN engine 216 of line card 210 of FIG. 2B). The system saves, by each respective other component, the first entry in a table of the respective other component (operation 434).

The system can also unicast the notification of the creation of the first entry. The system marks, by the ingress line card, the first entry as inactive (operation 442). The system transmits, by the ingress line card to the supervisor card, a request to cache the content object at the ingress line card (operation 444). If the supervisor card does not accept the request (decision 446), the operation returns. The system does nothing (i.e., takes no action), and the inactive first entry eventually times out and is removed by the ingress card. If the supervisor card accepts the request (decision 446), the system multicasts, by the supervisor card, the first notification message to the other components (operation 448). The system receives, by the ingress line card, the first notification message, and updates the first entry as active (operation 450). The operation then continues as described at operation 432, where each respective other component receives the first notification message (operation 432) and saves the first entry in a table of the respective other component (operation 434).

FIG. 4B depicts the operations that occur when the system determines to store the received and verified content in a cache of the ingress line card. The system can also determine to store the received and verified content in a cache of the egress line card. The egress line card performs operations similar to the operations performed by the ingress line card, as described above for operations 422-426 (i.e., storing the content or named data, creating a table entry, and notifying the other components), operations 428-434 (i.e., notification via multicast), and operations 442-450 (i.e., notification via unicast). In addition, the system can determine to store the received and verified content in both a cache of the ingress line card, and a cache of the egress line card, whereby the system performs the operations corresponding to each of the ingress line card and the egress line card.

High Availability Router Facilitates Centralized Cache Management

Figure 5A:
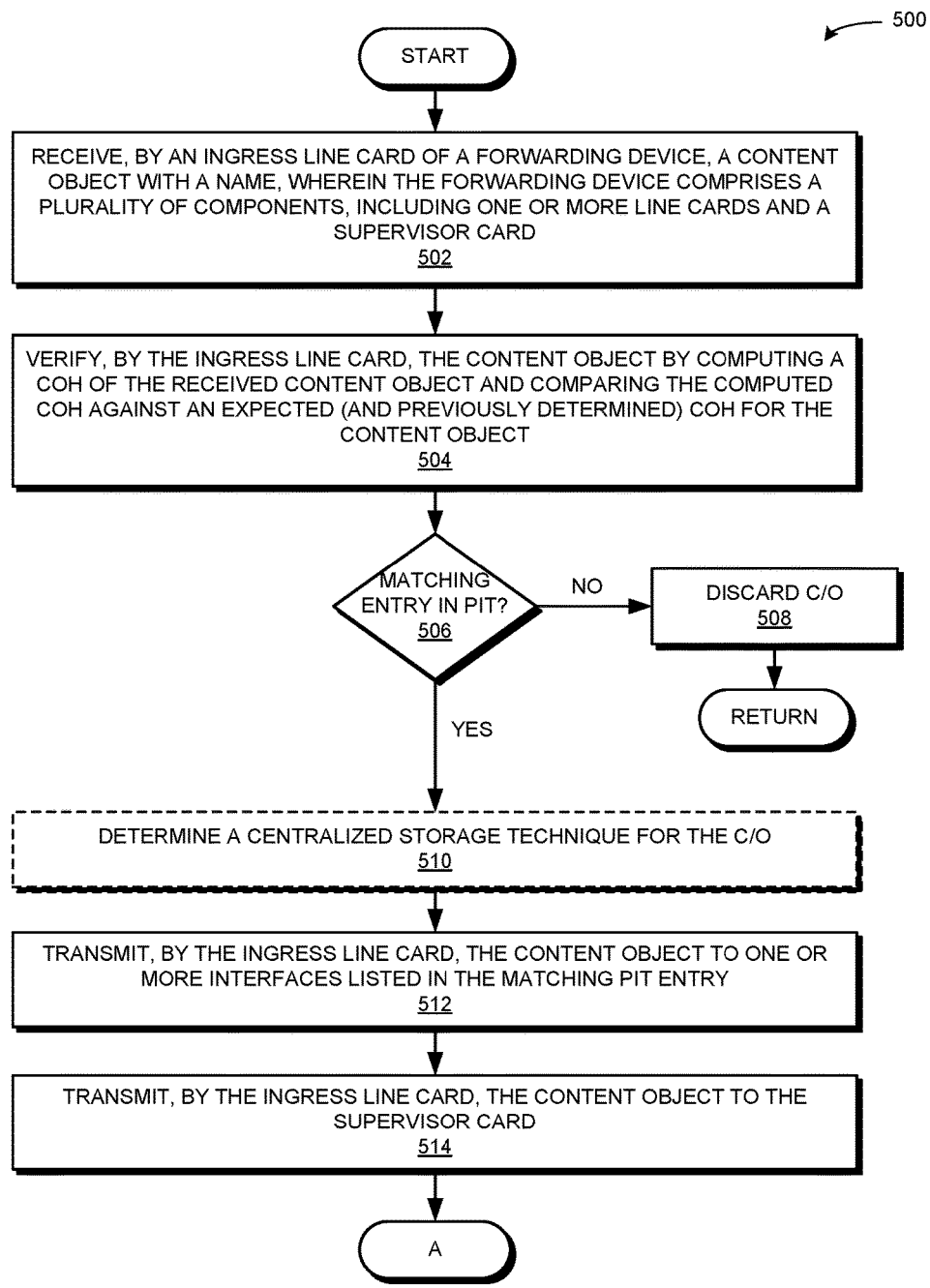
FIG. 5A presents a flow chart illustrating a method for processing a content object, including centralized cache management, in accordance with an embodiment of the present invention.

FIG. 5A presents a flow chart 500 illustrating a method for processing a content object, including centralized cache management, in accordance with an embodiment of the present invention. During operation, the system receives, by an ingress line card of a forwarding device, a content object with a name, wherein the forwarding device comprises a plurality of components, including one or more line cards and a supervisor card (operation 502). The system verifies, by the ingress line card, the content object by computing a COH value of the received content object and comparing the computed COH value against an expected (and previously determined) COH for the content object (operation 504). If the system does not find a matching entry based on the name in the PIT (decision 506), the system discards the content object (operation 508), and the operation returns. In some embodiments, even if no matching PIT entry exists, the system may still send the content object to the supervisor card for processing or caching, depending on a policy of the router. If the system does find a matching PIT entry (decision 506), the system optionally determines a centralized storage technique for the content object (operation 510). The system can store the content object in either a distributed manner (as depicted in FIGS. 4A-4B) or in a centralized manner (as depicted in FIGS. 5A-5C).

The system transmits, by the ingress line card, the content object to one or more interfaces listed in the matching PIT entry (operation 512). The system also transmits, by the ingress line card, the content object to the supervisor card (operation 514), and the operation continues as depicted at Label A of FIG. 5B. Note that the one or more interfaces can correspond to one or more egress line cards, and the ingress line card can transmit the content object to both the supervisor card and the egress line cards via unicast or multicast to groups of two or more cards.

Figure 5B:
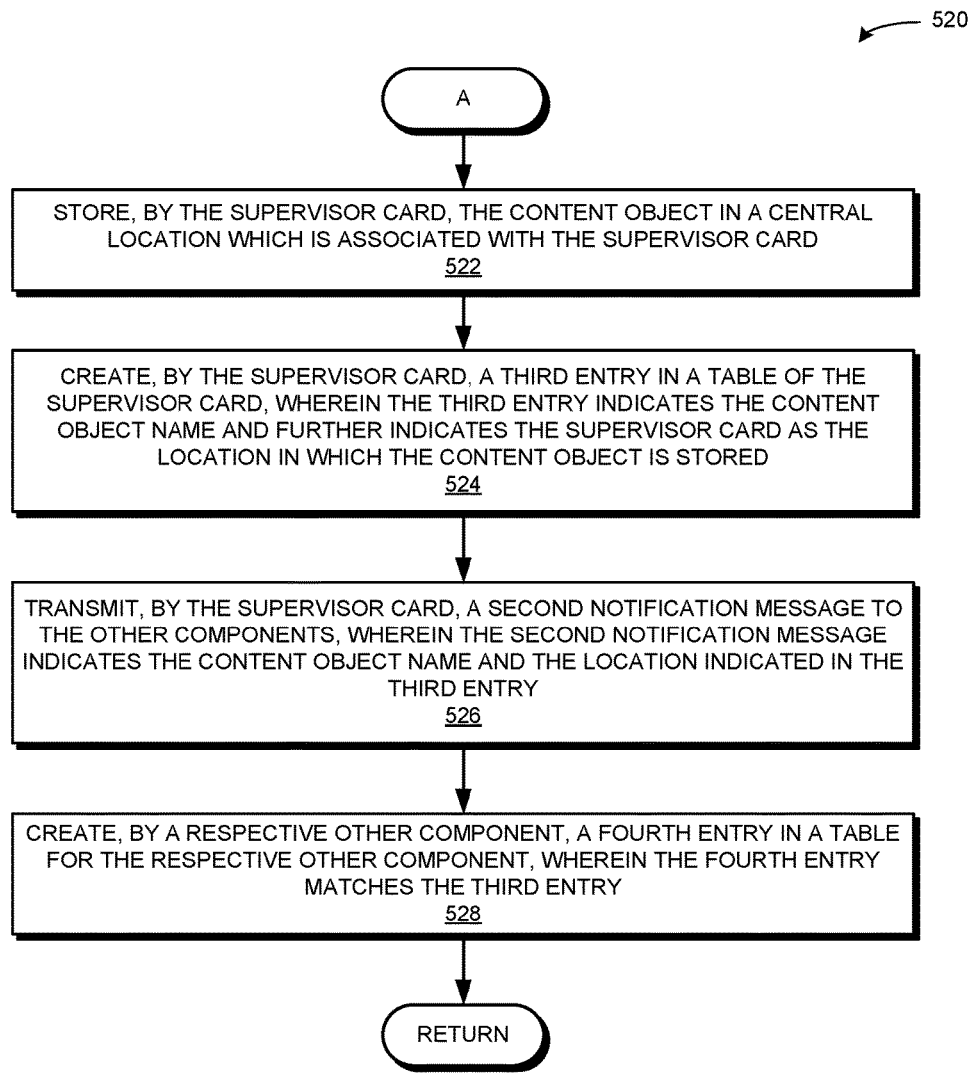
FIG. 5B presents a flow chart illustrating a method for processing a content object, including centralized cache management, in accordance with an embodiment of the present invention.

FIG. 5B presents a flow chart 520 illustrating a method for processing a content object, including centralized cache management, in accordance with an embodiment of the present invention. During operation, the system stores, by the supervisor card, the content object in a central location which is associated with the supervisor card (operation 522). The central location which is associated with the supervisor card can be one or more of: (a) a cache on the supervisor card; (b) an external storage device attached to the supervisor card; (c) an external storage device attached to a line card; and (d) a dedicated line card for storage. In some embodiments (e.g., for central locations (b), (c), and (d) above), the supervisor card transmits the content object to the central location. The system creates, by the supervisor card, a third entry in a table of the supervisor card, wherein the third entry indicates the content object name and further indicates the supervisor card as the location in which the content object is stored (operation 524). The system transmits, by the supervisor card, a second notification message to the other components, wherein the second notification message indicates the content object name and the location indicated in the third entry (operation 526). Subsequently, the system creates, by a respective other component, a fourth entry in a table for the respective other component, wherein the fourth entry matches the third entry (operation 528). Transmitting the second notification message to central locations (c) and (d) is described below in relation to FIG. 5C.

Figure 5C:
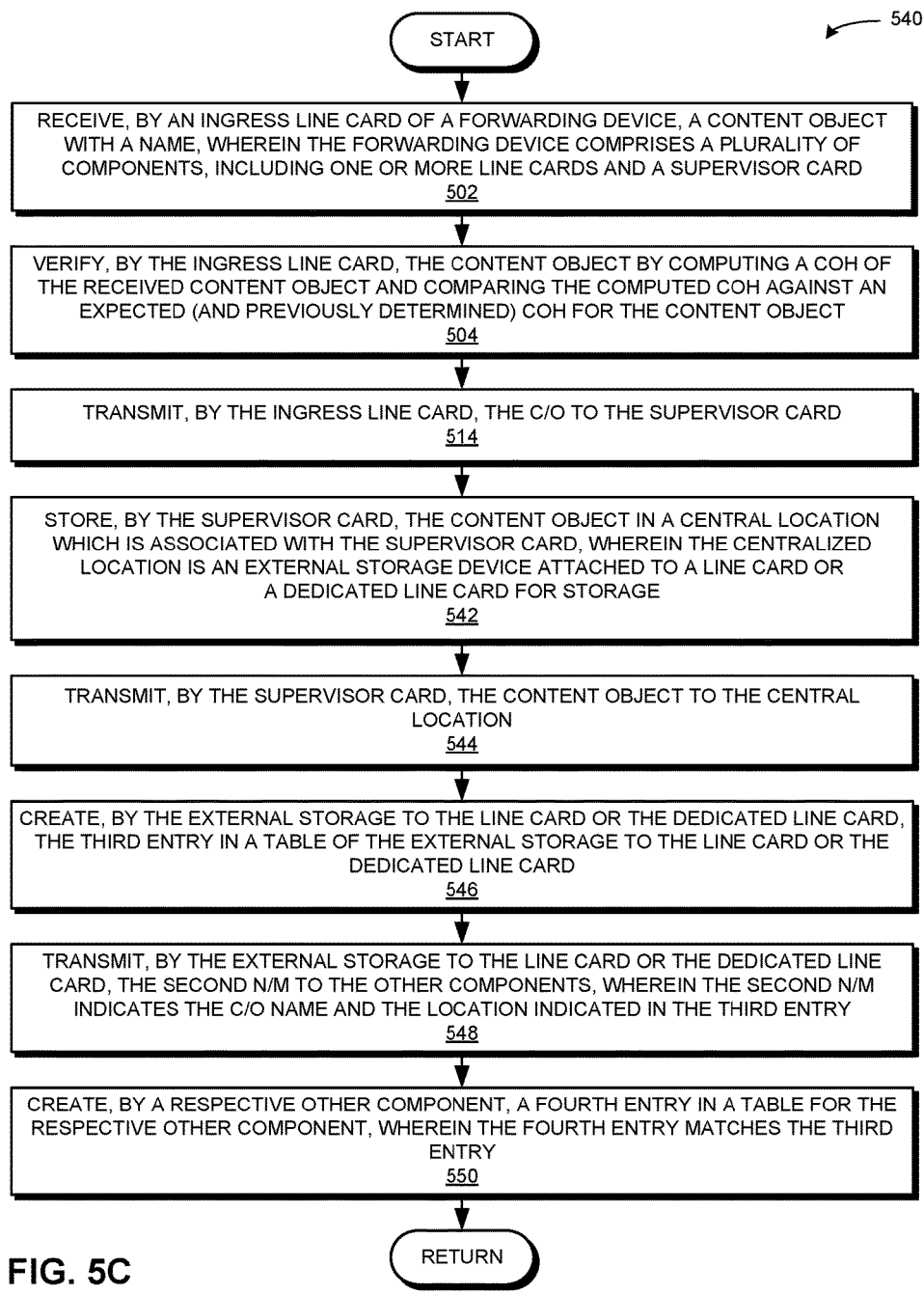
FIG. 5C presents a flow chart illustrating a method for processing a content object, including centralized cache management where the central location is an external storage device attached to a line card or a dedicated line card, in accordance with an embodiment of the present invention.

FIG. 5C presents a flow chart 540 illustrating a method for processing a content object, including centralized cache management where the central location is an external storage device attached to a line card or a dedicated line card, in accordance with an embodiment of the present invention. During operation, the system receives, by an ingress line card of a forwarding device, a content object with a name, wherein the forwarding device comprises a plurality of components, including one or more line cards and a supervisor card (operation 502). The system verifies, by the ingress line card, the content object by computing a COH value of the received content object and comparing the computed COH value against an expected (and previously determined) COH for the content object (operation 504). The system transmits, by the ingress line card, the content object to the supervisor card (operation 514). The system stores, by the supervisor card, the content object in a central location which is associated with the supervisor card, wherein the central location is an external storage device attached to a line card or a dedicated line card for storage (operation 542).

The system transmits, by the supervisor card, the content object to the central location (i.e., the external storage attached to the line card or the dedicated line card) (operation 544). The system creates, by the external storage device attached to the line card or by the dedicated line card, the third entry in a table of the external storage attached to the line card or the dedicated line card (operation 546). In some embodiments, the third entry can indicate the content object name and can further indicate the external storage device attached to the line card or the dedicated line card as the central location associated with the supervisor card in which the content object is stored. The system transmits, by the external storage device attached to the line card or by the dedicated line card, the second notification message to the other components, wherein the second notification message indicates the content object name and the location indicated in the third entry (operation 548). Subsequently, the system creates, by a respective other component, a fourth entry in a table for the respective other component, wherein the fourth entry matches the third entry (operation 550).

High Availability Router Processes Interest

Figure 6:
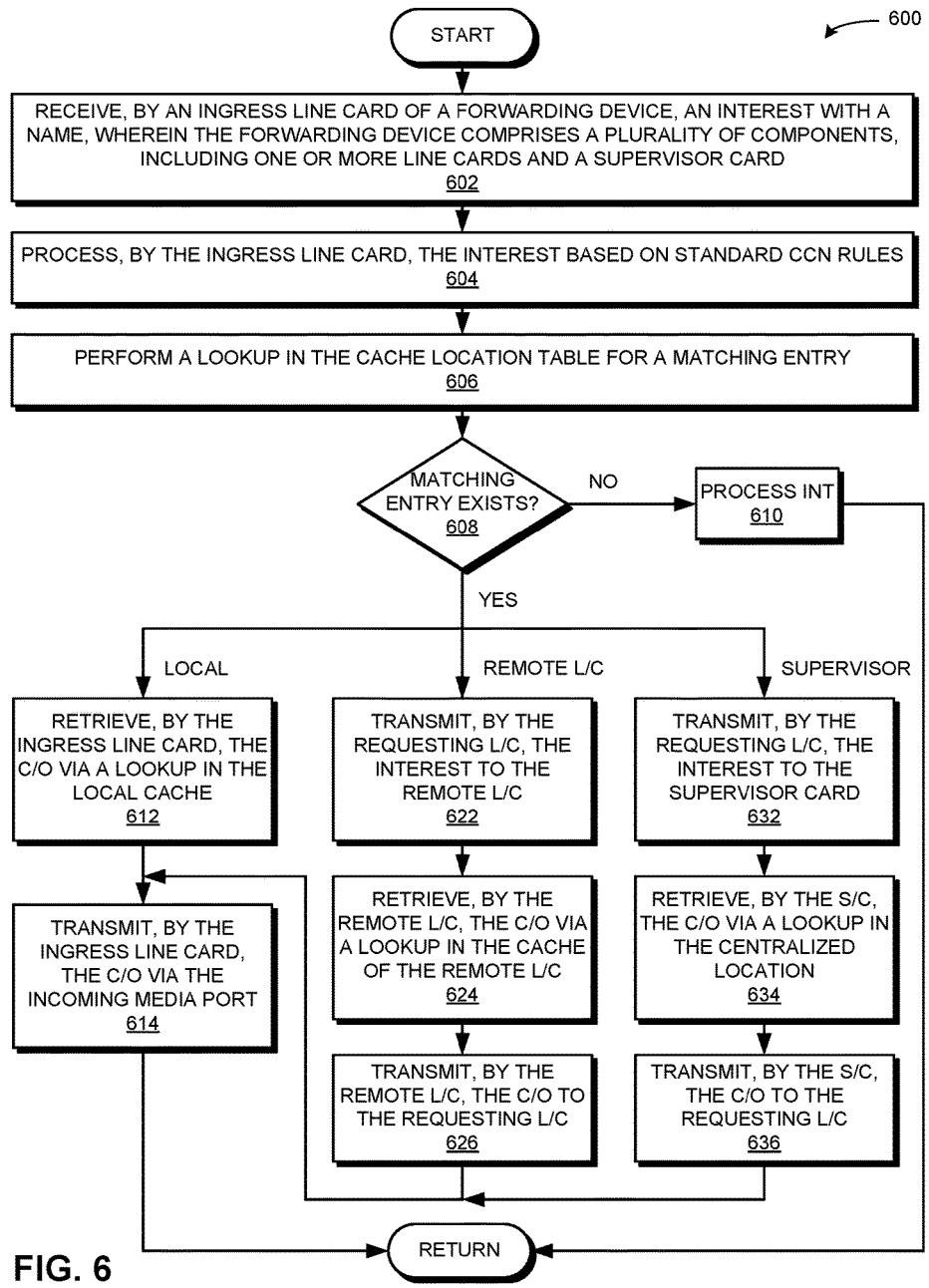
FIG. 6 presents a flow chart illustrating a method for processing an interest, in accordance with an embodiment of the present invention.

FIG. 6 presents a flow chart 600 illustrating a method for processing an interest, in accordance with an embodiment of the present invention. During operation, the system receives, by an ingress line card of a forwarding device, an interest with a name, wherein the forwarding device comprises a plurality of components, including one or more line cards and a supervisor card (operation 602). The system processes, by the ingress line card, the interest based on standard CCN rules (operation 604). The system performs a lookup in the named data cache location table (or cache location table) for a matching entry (operation 606) (i.e., to determine whether a matching entry exists). If a matching entry does not exist (decision 608) (implying a cache miss), the system processes the interest based on standard CCN rules (operation 610), as described above in relation to FIGS. 1A and 1B. If a matching entry does exist in the cache location table (decision 608), the system can operate based on where the content is stored. If the matching entry indicates that the named data is stored locally (i.e., on the local ingress line card), the system retrieves, by the ingress line card, the content object via a lookup in the local cache (operation 612). The system transmits, by the ingress line card, the content object via the incoming media port or arrival interface of the interest (operation 614).

If the matching entry indicates that the named data is stored on a remote line card (i.e., on an egress line card), the system transmits, by the requesting line card (i.e., the ingress line card), the interest to the remote line card (operation 622). The system retrieves, by the remote line card, the content object via a lookup in the cache of the remote line card (operation 624). The system transmits, by the remote line card, the content object to the requesting line card (i.e., the ingress line card) (operation 626). The system transmits, by the ingress line card, the content object via the incoming media port or arrival interface of the interest (operation 614).

If the matching entry indicates that the named data is stored in a central location which is associated with the supervisor card, the system transmits, by the requesting line card (i.e., the ingress line card), the interest to the supervisor card (operation 632). The system retrieves, by the supervisor card, the content object via a lookup in the central location (operation 634). The system transmits, by the supervisor card, the content object to the requesting line card (i.e., the ingress line card) (operation 636). Finally, the system transmits, by the ingress line card, the content object via the incoming media port or arrival interface of the interest (operation 614).

Exemplary Use Cases

Figure 7A:
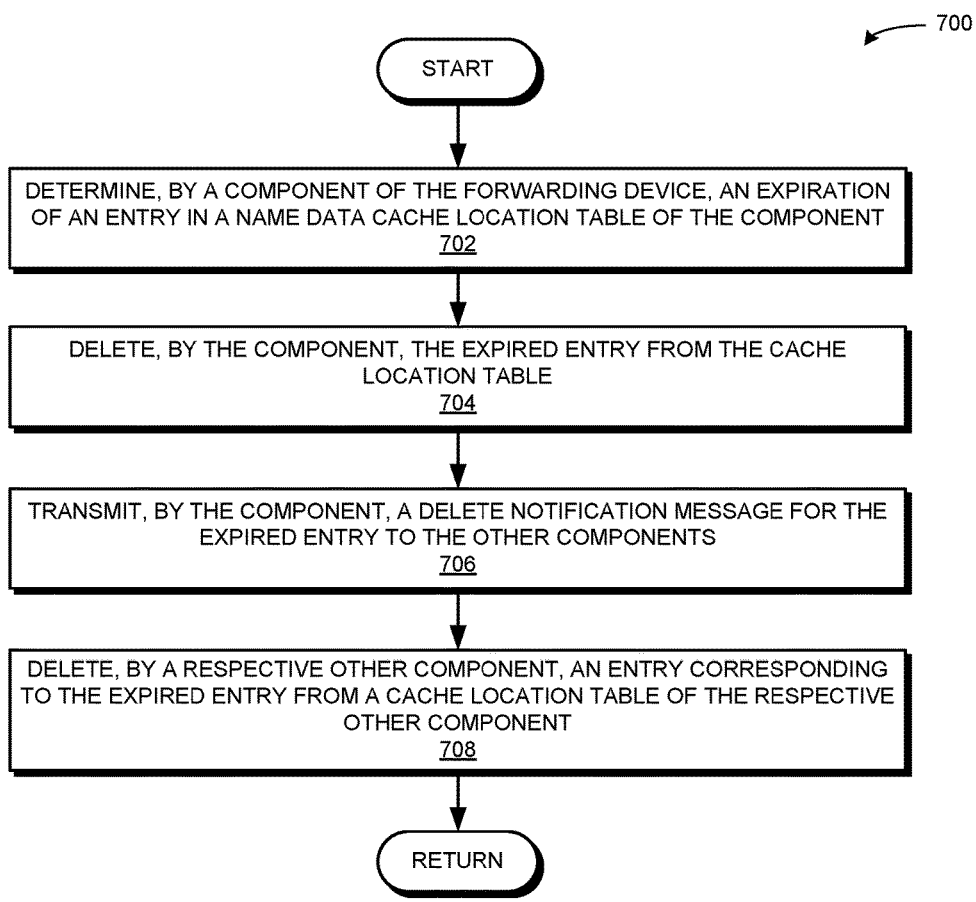
FIG. 7A presents a flow chart illustrating a method for handling removal of an entry from a named data cache location table, in accordance with an embodiment of the present invention.

FIG. 7A presents a flow chart 700 illustrating a method for handling removal of an entry from a named data cache location table, in accordance with an embodiment of the present invention. During operation, the system determines, by a component of the forwarding device, an expiration of an entry in a named data cache location table of the component (or cache location table) (operation 702). The component can be a line card or the supervisor card. The system deletes, by the component, the expired entry from the cache location table (operation 704). The system transmits, by the component, a delete notification message for the expired entry to the other components (operation 706). Subsequently, the system deletes, by a respective other component, an entry corresponding to the expired entry from a cache location table of the respective other component (operation 708).

Figure 7B:
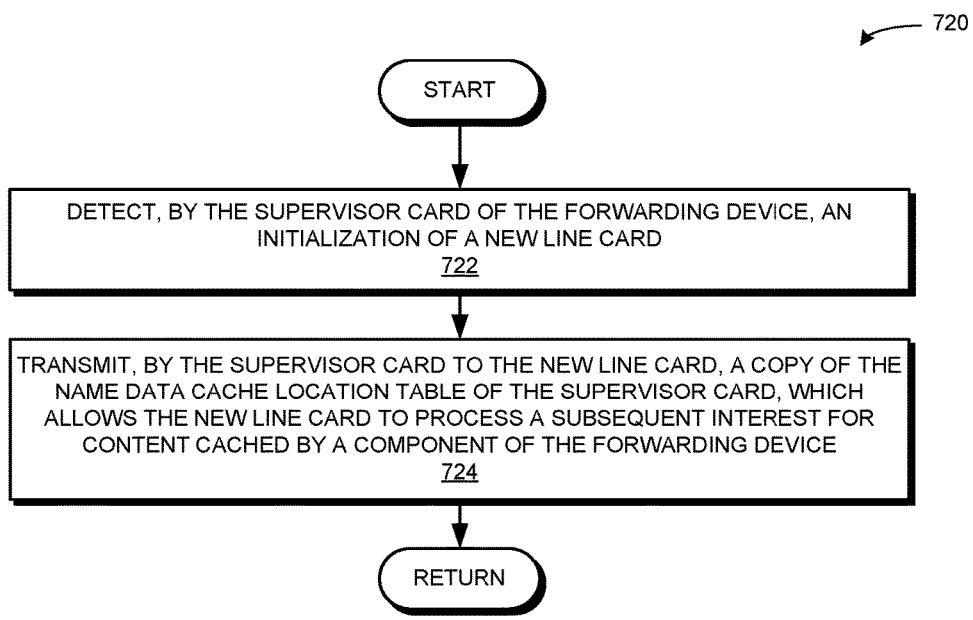
FIG. 7B presents a flow chart illustrating a method for handling initialization of a new line card, in accordance with an embodiment of the present invention.

FIG. 7B presents a flow chart 720 illustrating a method for handling initialization of a new line card, in accordance with an embodiment of the present invention. During operation, the system detects, by the supervisor card of the forwarding device, an initialization of a new line card (operation 722). The system transmits, by the supervisor card to the new line card, a copy of the named data cache location table of the supervisor card (operation 724). This allows the new line card to process a subsequent interest for content cached by a component of the forwarding device.

Figure 7C:
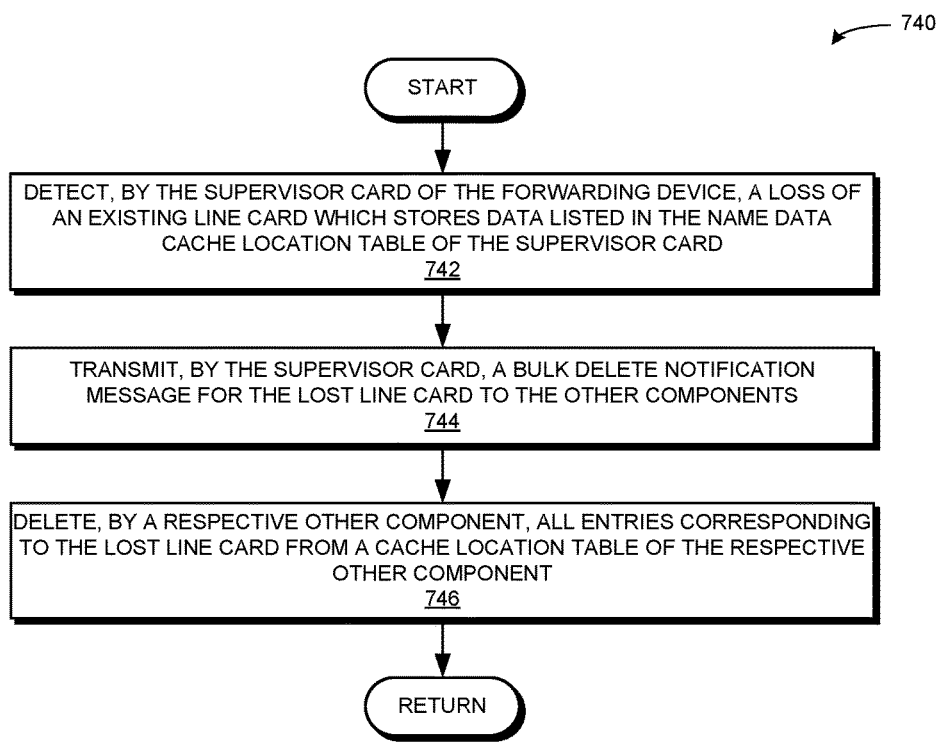
FIG. 7C presents a flow chart illustrating a method for handling the loss of an existing line card, in accordance with an embodiment of the present invention.

FIG. 7C presents a flow chart 740 illustrating a method for handling the loss of an existing line card, in accordance with an embodiment of the present invention. During operation, the system detects, by the supervisor card of the forwarding device, a loss of an existing line card which stores data listed in the named data cache location table of the supervisor card (operation 742). The system transmits, by the supervisor card, a bulk delete notification message for the lost line card to the other components of the router (operation 744). Subsequently, the system deletes, by a respective other component, all entries corresponding to the lost line card from a cache location table of the respective other component (operation 746).

Note that when a non-hosting line card goes down (i.e., a line card that includes a named data cache location table but that does not store or host any data), the system need not take any actions. In this case, there is no need to send an update to any other line cards.

Exemplary Computer System

Figure 8:
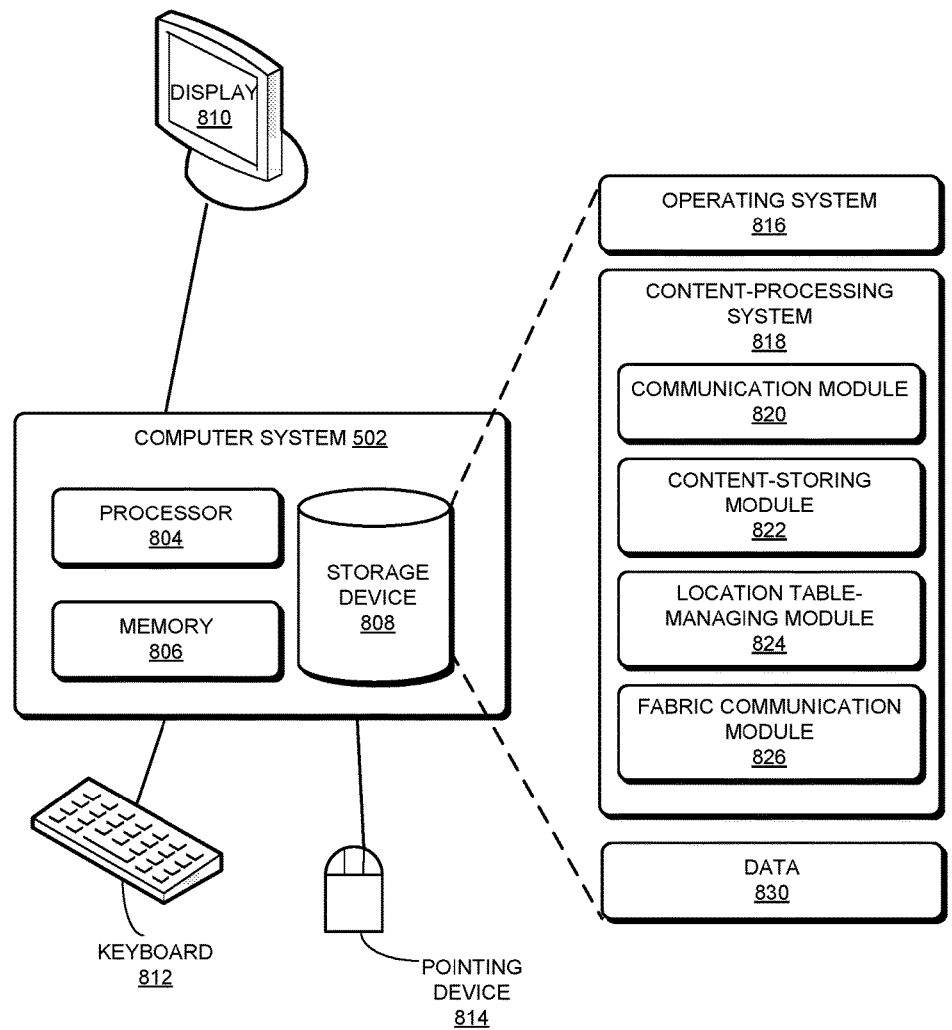
FIG. 8 illustrates an exemplary computer system which facilitates cache management on high availability routers in a content centric network, in accordance with an embodiment of the present invention.

FIG. 8 illustrates an exemplary computer system which facilitates cache management on high availability routers in a content centric network, in accordance with an embodiment of the present invention. Computer system 802 includes a processor 804, a memory 806, and a storage device 808. Memory 806 can include a volatile memory (e.g., RAM) that serves as a managed memory, and can be used to store one or more memory pools. Furthermore, computer system 802 can be coupled to a display device 810, a keyboard 812, and a pointing device 814. Storage device 808 can store an operating system 816, a content-processing system 818, and data 832.

Content-processing system 818 can include instructions, which when executed by computer system 802, can cause computer system 802 to perform methods and/or processes described in this disclosure. Specifically, content-processing system 818 may include instructions for sending and/or receiving data packets to/from other network nodes across a computer network, such as a content centric network (communication module 820). A data packet can include an interest packet or a content object packet with a name which is an HSVLI that includes contiguous name components ordered from a most general level to a most specific level.

Furthermore, content-processing system 818 can include instructions for receiving, by an ingress line card of a forwarding device, a content object with a name (communication module 520). Content-processing system 818 can include instructions for in response to determining a distributed storage technique (content-storing module 822): storing, by a selected line card, the content object in a location which is a cache of the selected line card (content-storing module 822); creating, by the selected line card, a first entry in a table of the selected line card, wherein the first entry indicates the content object name and the location in which the content object is stored (location table-managing module 824); transmitting, by the selected line card, a first notification message to other components, wherein the first notification message indicates the content object name and the location indicated in the first entry (fabric communication module 826); and creating, by a respective other component, a second entry in a table for the respective other component, wherein the second entry matches the first entry (location table-managing module 824).

Content-processing system 818 can also include instructions for transmitting, by the ingress line card, the content object to the egress line card (fabric communication module 826). Content-processing system 818 can include instructions for storing the content object (content-storing module 822), creating the first entry (location table-managing module 824), and transmitting the first notification message (fabric communication module 826) by the ingress line card, and can include further instruction for storing the content object (content-storing module 822), creating the first entry (location table-managing module 824), and transmitting the first notification message (fabric communication module 826) by the egress line card. Content-processing system 818 can also include instructions for marking, by the selected line card, the first entry as active (location table-managing module 824), and for multicasting, by the selected line card, the first notification message to the other components (fabric communication module 826).

Content-processing system 818 can additionally include instructions for marking, by the selected line card, the first entry as inactive (location table-managing module 824). Content-processing system 818 can include instructions for transmitting, by the selected line card to the supervisor card, a request to cache the content object at the location (fabric communication module 826). Content-processing system 818 can include instructions for, in response to accepting, by the supervisor card, the request to cache the content object at the location (fabric communication module 826): multicasting, by the supervisor card, the first notification message to the other components (fabric communication module 826); marking, by the selected line card, the first entry as active (location table-managing module 824); and creating, by the respective other component, the second entry in the table for the respective other component (location table-managing module 824).

Content-processing system 818 can also include instructions for, in response to not accepting, by the supervisor card, the request to cache the content object at the location (fabric communication module 826), removing, by the selected line card, the first entry from the table of the selected line card based on a timeout of the first entry (location table-managing module 824).

Moreover, content-processing system 818 can include instructions for, in response to determining a centralized storage technique (content-storing module 822), transmitting, by the ingress line card, the content object to the supervisor card (fabric communication module 826). Content-processing system 818 can include instructions for storing, by the supervisor card, the content object in a central location which is associated with the supervisor card (content-storing module 822). Content-processing system 818 can include instructions for creating, by the supervisor card, a third entry in a table of the supervisor card, wherein the third entry indicates the content object name and further indicates the supervisor card as the central location in which the content object is stored (location table-managing module 824). Content-processing system 818 can include instructions for transmitting, by the supervisor card, a second notification message to the other components, wherein the second notification message indicates the content object name and the location indicated in the third entry (fabric communication module 826). Content-processing system 818 can include instructions for creating, by a respective other component, a fourth entry in a table for the respective other component, wherein the fourth entry matches the third entry (location table-managing module 824).

Data 830 can include any data that is required as input or that is generated as output by the methods and/or processes described in this disclosure. Specifically, data 830 can store at least: an interest or interest packet; a content object or content object packet; a name; a name that is an HSVLI that includes contiguous name components ordered from a most general level to a most specific level; a name of data, including an interest name or a content object name; an indicator of one or more components of a forwarding device; an indicator of at least one line card; an indicator of an ingress line card, a local line card, a remote line card, or an egress line card; an indicator of a supervisor card, an active supervisor card, or a standby supervisor card; a cache or content store associated with a component; a table mapping a name of data to a location in which the corresponding named data is stored; an entry in the table; a field or indicator of an entry with an active or inactive status; a notification message; a notification message which indicates a name of data and a location in which the named data is stored; a request to cache a content object at a location; a response to the request to cache a content object at a location; a central location associated with a supervisor card; and an indicator of a central location which is a cache on the supervisor card, an external storage device attached to the supervisor card, an external storage device attached to a line card, and a dedicated line card for storage.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A forwarding device, comprising:
a plurality of components, including one or more line cards and a supervisor card, wherein the components perform a method, the method comprising:
receiving, by an ingress line card of the forwarding device, a content object with a name;
in response to determining a distributed storage technique:
storing, by a selected line card, the content object in a location which is a cache of the selected line card;
creating, by the selected line card, a first entry in a table of the selected line card, wherein the first entry indicates the content object name and the location in which the content object is stored;
transmitting, by the selected line card, a first notification message to other components, wherein the first notification message indicates the content object name and the location indicated in the first entry; and
creating, by a respective other component, a second entry in a table for the respective other component, wherein the second entry matches the first entry.

2. The forwarding device of claim 1, wherein the selected line card is one or more of the ingress line card and an egress line card,
wherein if the selected line card is the egress line card, the method further comprises transmitting, by the ingress line card, the content object to the egress line card, and
wherein if the selected line card is both the ingress line card and the egress line card:
storing the content object, creating the first entry, and transmitting the first notification message are performed by the ingress line card, and
storing the content object, creating the first entry, and transmitting the first notification message are performed by the egress line card.

3. The forwarding device of claim 1, wherein transmitting the first notification message further comprises:
marking, by the selected line card, the first entry as active; and
multicasting, by the selected line card, the first notification message to the other components.

4. The forwarding device of claim 1, wherein transmitting the first notification message further comprises:
marking, by the selected line card, the first entry as inactive;
transmitting, by the selected line card to the supervisor card, a request to cache the content object at the location; and
in response to accepting, by the supervisor card, the request to cache the content object at the location:
multicasting, by the supervisor card, the first notification message to the other components;
marking, by the selected line card, the first entry as active; and
creating, by the respective other component, the second entry in the table for the respective other component.

5. The forwarding device of claim 4, wherein the method further comprises:
in response to not accepting, by the supervisor card, the request to cache the content object at the location, removing, by the selected line card, the first entry from the table of the selected line card based on a timeout of the first entry.

6. The forwarding device of claim 1, wherein in response to determining a centralized storage technique, the method further comprises:
transmitting, by the ingress line card, the content object to the supervisor card;
storing, by the supervisor card, the content object in a central location which is associated with the supervisor card;
creating, by the supervisor card, a third entry in a table of the supervisor card, wherein the third entry indicates the content object name and further indicates the supervisor card as the central location in which the content object is stored;
transmitting, by the supervisor card, a second notification message to the other components, wherein the second notification message indicates the content object name and the location indicated in the third entry; and
creating, by a respective other component, a fourth entry in a table for the respective other component, wherein the fourth entry matches the third entry.

7. The forwarding device of claim 6, wherein the central location is one or more of:
a cache on the supervisor card;
an external storage device attached to the supervisor card;
an external storage device attached to a line card; and
a dedicated line card for storage, wherein the dedicated line card is accessed only by the supervisor card.

8. The forwarding device of claim 7, wherein if the central location is the external storage device attached to the supervisor card, the external storage device attached to the line card, or the dedicated line card for storage, the method further comprises:
transmitting, by the supervisor card, the content object to the central location.

9. The forwarding device of claim 7, wherein transmitting the second notification message further comprises:
creating, by the external storage device attached to the line card or the dedicated line card for storage, the third entry in a table of the external storage device attached to the line card or the dedicated line card for storage; and
transmitting, by the external storage device attached to the line card or the dedicated line card for storage, the second notification message to the other components.

10. The forwarding device of claim 6, wherein transmitting the second notification message further comprises multicasting, by the supervisor card, the second notification message to the other components.

11. A computer-implemented method, comprising:
receiving, by an ingress line card of a forwarding device, a content object with a name, wherein the forwarding device comprises a plurality of components, including one or more line cards and a supervisor card;
in response to determining a distributed storage technique:
storing, by a selected line card, the content object in a location which is a cache of the selected line card;
creating, by the selected line card, a first entry in a table of the selected line card, wherein the first entry indicates the content object name and the location in which the content object is stored;
transmitting, by the selected line card, a first notification message to other components, wherein the first notification message indicates the content object name and the location indicated in the first entry; and
creating, by a respective other component, a second entry in a table for the respective other component, wherein the second entry matches the first entry.

12. The method of claim 11, wherein the selected line card is one or more of the ingress line card and an egress line card,
wherein if the selected line card is an egress line card, the method further comprises transmitting, by the ingress line card, the content object to the egress line card, and
wherein if the selected line card is both the ingress line card and the egress line card:
storing the content object, creating the first entry, and transmitting the first notification message are performed by the ingress line card, and
storing the content object, creating the first entry, and transmitting the first notification message are performed by the egress line card.

13. The method of claim 11, wherein transmitting the first notification message further comprises:
marking, by the selected line card, the first entry as active; and
multicasting, by the selected line card, the first notification message to the other components.

14. The method of claim 11, wherein transmitting the first notification message further comprises:
marking, by the selected line card, the first entry as inactive;
transmitting, by the selected line card to the supervisor card, a request to cache the content object at the location; and
in response to accepting, by the supervisor card, the request to cache the content object at the location:
multicasting, by the supervisor card, the first notification message to the other components;
marking, by the selected line card, the first entry as active; and
creating, by the respective other component, the second entry in the table for the respective other component.

15. The method of claim 14, further comprising:
in response to not accepting, by the supervisor card, the request to cache the content object at the location, removing, by the selected line card, the first entry from the table of the selected line card based on a timeout of the first entry.

16. The method of claim 11, wherein in response to determining a centralized storage technique, the method further comprises:
transmitting, by the ingress line card, the content object to the supervisor card;
storing, by the supervisor card, the content object in a central location which is associated with the supervisor card;
creating, by the supervisor card, a third entry in a table of the supervisor card, wherein the third entry indicates the content object name and further indicates the supervisor card as the central location in which the content object is stored;
transmitting, by the supervisor card, a second notification message to the other components, wherein the second notification message indicates the content object name and the location indicated in the third entry; and
creating, by a respective other component, a fourth entry in a table for the respective other component, wherein the fourth entry matches the third entry.

17. The method of claim 16, wherein the central location is one or more of:
a cache on the supervisor card;
an external storage device attached to the supervisor card;
an external storage device attached to a line card; and
a dedicated line card for storage, wherein the dedicated line card is accessed only by the supervisor card.

18. The method of claim 17, wherein if the central location is the external storage device attached to the supervisor card, the external storage device attached to the line card, or the dedicated line card for storage, the method further comprises:
transmitting, by the supervisor card, the content object to the central location.

19. The method of claim 17, wherein transmitting the second notification message further comprises:
creating, by the external storage device attached to the line card or the dedicated line card for storage, the third entry in a table of the external storage device attached to the line card or the dedicated line card for storage; and
transmitting, by the external storage device attached to the line card or the dedicated line card for storage, the second notification message to the other components.

20. The method of claim 16, wherein transmitting the second notification message further comprises multicasting, by the supervisor card, the second notification message to the other components.

* * * * *